United States Patent
Tang et al.

(10) Patent No.: US 9,703,074 B2
(45) Date of Patent: Jul. 11, 2017

(54) MOBILE DEVICE AND OPTICAL IMAGING LENS THEREOF

(71) Applicant: GeniuS Electronic Optical Co., Ltd., Taichung (TW)

(72) Inventors: Tzu-Chien Tang, Taichung (TW); Chih-Yang Yeh, Taichung (TW)

(73) Assignee: GeniuS Electronic Optical Co., Ltd., Taichung (TW)

(*) Notice: Subject to any disclaimer, the term of this patent is extended or adjusted under 35 U.S.C. 154(b) by 263 days.

(21) Appl. No.: 14/507,386

(22) Filed: Oct. 6, 2014

(65) Prior Publication Data

US 2015/0260960 A1    Sep. 17, 2015

(30) Foreign Application Priority Data

Mar. 12, 2014  (TW) .............................. 103108712 A

(51) Int. Cl.
*G02B 13/00*    (2006.01)

(52) U.S. Cl.
CPC ................................ *G02B 13/0045* (2013.01)

(58) Field of Classification Search
None
See application file for complete search history.

(56) References Cited

U.S. PATENT DOCUMENTS

| 7,663,814 | B2 | 2/2010 | Kitahara |
| 7,907,352 | B2 | 3/2011 | Miyano |
| 8,054,562 | B2 | 11/2011 | Asami |
| 8,355,215 | B2 | 1/2013 | Asami |
| 2010/0305405 | A1 | 12/2010 | Miyano |
| 2011/0249349 | A1* | 10/2011 | Asami ............... G02B 9/62 359/797 |

FOREIGN PATENT DOCUMENTS

| CN | 201438236 | | 4/2010 | |
| CN | 201955535 | | 8/2011 | |
| JP | 2008233610 | | 10/2008 | |
| JP | 02008233610 | A * | 10/2008 | ............ G02B 13/04 |
| KR | 20100065622 | | 6/2010 | |
| KR | 1020100065622 | A * | 6/2010 | ............... G02B 9/62 |
| TW | M354744 | | 4/2009 | |
| TW | 201038968 | | 11/2010 | |
| TW | M399331 | | 3/2011 | |
| TW | 201317615 | A | 10/2012 | |

OTHER PUBLICATIONS

Official Action from Chinese Patent Application No. 201410089139.8 dated Nov. 30, 2015.
Office action from Taiwan patent application No. 103108712 dated Dec. 11, 2014.

\* cited by examiner

*Primary Examiner* — Scott J Sugarman
*Assistant Examiner* — Gary O'Neill
(74) *Attorney, Agent, or Firm* — Baker & McKenzie LLP

(57) ABSTRACT

The present invention provides a camera device and an optical imaging lens thereof. The optical imaging lens comprises six lens elements positioned in an order from an object side to an image side and an aperture stop positioned between the third and fourth lens elements. Through controlling the convex or concave shape of the surfaces of the lens elements, the optical imaging lens shows better optical characteristics and the total length of the optical imaging lens is shortened.

17 Claims, 30 Drawing Sheets

| | f(Focus)=1.8569mm, HFOV(Half angular field of view)= 58.7408deg., System length=19.8095mm, Image height=3mm, Fno=2.4 |
|---|---|---|---|---|---|---|---|
| Surface # | | Radius | Thickness | Refractive index | Abbe number | Focus | Material |
| - | Object | ∞ | ∞ | | | | |
| 111 | 1st lens element | 9.9253 | 1.0000_T1 | 1.489_n1 | 70.405_v1 | -28.183_f1 | glass |
| 112 | | 5.5779 | 3.2558_G12 | | | | |
| 121 | 2nd lens element | 5.9051 | 0.9886_T2 | 1.546_n2 | 56.114_v2 | -5.050_f2 | plastic |
| 122 | | 1.7683 | 4.0701_G23 | | | | |
| 131 | 3rd lens element | 12.5760 | 3.4496_T3 | 1.546_n3 | 56.114_v3 | 9.272_f3 | plastic |
| 132 | | -7.6518 | 0.1551_G34-TA | | | | |
| 100 | Aperture stop | 1.00E+18 | 1.0746_TA | | | | |
| 141 | 4th lens element | 14.5346 | 1.0960_T4 | 1.546_n4 | 56.114_v4 | 3.938_f4 | plastic |
| 142 | | -2.4560 | 0.1061_G45 | | | | |
| 151 | 5th lens element | 16.7536 | 1.0111_T5 | 1.775_n5 | 49.624_v5 | 3.153_f5 | glass |
| 152/161 | 6th lens element | -2.7876 | 0.3000_T6 | 1.775_n6 | 23.825_v6 | -2.555_f6 | glass |
| 162 | | 10.5025 | 3.3025_BFL | | | | |
| 170 | Image plane | ∞ | | | | | |

FIG.4

| Aspherical parameters | | | |
|---|---|---|---|
| Surface # | 121 | 122 | 131 |
| K | 1.6597E-01 | -1.0742E+00 | 6.5888E-09 |
| $a_4$ | -1.0390E-03 | 7.0935E-03 | -6.3172E-03 |
| $a_6$ | 0.0000E+00 | 0.0000E+00 | -6.5845E-04 |
| $a_8$ | 0.0000E+00 | 0.0000E+00 | 6.6536E-05 |
| $a_{10}$ | 0.0000E+00 | 0.0000E+00 | 0.0000E+00 |
| $a_{12}$ | 0.0000E+00 | 0.0000E+00 | 0.0000E+00 |
| $a_{14}$ | 0.0000E+00 | 0.0000E+00 | 0.0000E+00 |
| $a_{16}$ | 0.0000E+00 | 0.0000E+00 | 0.0000E+00 |
| Surface # | 132 | 141 | 142 |
| K | -8.7060E-09 | -1.4771E-09 | -2.0434E+00 |
| $a_4$ | 3.9226E-03 | -6.1365E-03 | -9.0193E-03 |
| $a_6$ | -1.6082E-03 | 3.1040E-04 | 8.7241E-06 |
| $a_8$ | 1.6864E-03 | 0.0000E+00 | 0.0000E+00 |
| $a_{10}$ | 0.0000E+00 | 0.0000E+00 | 0.0000E+00 |
| $a_{12}$ | 0.0000E+00 | 0.0000E+00 | 0.0000E+00 |
| $a_{14}$ | 0.0000E+00 | 0.0000E+00 | 0.0000E+00 |
| $a_{16}$ | 0.0000E+00 | 0.0000E+00 | 0.0000E+00 |

FIG.5

| f(Focus)=2.0248mm, HFOV(Half angular field of view)= 56.4476deg., System length=18.9545mm, Image height=3mm, Fno=2.4 |||||||  |
|---|---|---|---|---|---|---|---|
| Surface # | | Radius | Thickness | Refractive index | Abbe number | Focus | Material |
| - | Object | ∞ | ∞ | | | | |
| 211 | 1st lens element | 19.7789 | 1.0000_T1 | 1.489_n1 | 70.405_v1 | -29.6339 | glass |
| 212 | | 8.2223 | 0.1029_G12 | | | | |
| 221 | 2nd lens element | 7.0922 | 3.1361_T2 | 1.546_n2 | 56.114_v2 | -4.67 | plastic |
| 222 | | 1.5825 | 3.0677_G23 | | | | |
| 231 | 3rd lens element | 7.4860 | 4.0446_T3 | 1.546_n3 | 56.114_v3 | 9.2472 | plastic |
| 232 | | -12.5454 | 0.1000_G34-TA | | | | |
| 200 | Aperture stop | 1.00E+18 | 0.8692_TA | | | | |
| 241 | 4th lens element | 20.3454 | 1.4588_T4 | 1.546_n4 | 56.114_v4 | 4.0809 | plastic |
| 242 | | -2.4385 | 0.1200_G45 | | | | |
| 251 | 5th lens element | 32.3640 | 1.7818_T5 | 1.775_n5 | 49.624_v5 | 2.9287 | glass |
| 252/261 | 6th lens element | -2.3834 | 0.3000_T6 | 1.775_n6 | 23.825_v6 | -2.8417 | glass |
| 262 | | -150.0000 | 2.9735_BFL | | | | |
| 270 | Image plane | ∞ | | | | | |

FIG.8

| Aspherical parameters | | | |
|---|---|---|---|
| Surface # | 221 | 222 | 231 |
| K | 4.6936E-02 | -9.9858E-01 | 1.0527E+00 |
| $a_4$ | -5.2885E-04 | 4.0486E-03 | -4.5423E-03 |
| $a_6$ | 0.0000E+00 | 0.0000E+00 | -5.1475E-04 |
| $a_8$ | 0.0000E+00 | 0.0000E+00 | 3.7103E-05 |
| $a_{10}$ | 0.0000E+00 | 0.0000E+00 | 0.0000E+00 |
| $a_{12}$ | 0.0000E+00 | 0.0000E+00 | 0.0000E+00 |
| $a_{14}$ | 0.0000E+00 | 0.0000E+00 | 0.0000E+00 |
| $a_{16}$ | 0.0000E+00 | 0.0000E+00 | 0.0000E+00 |
| Surface # | 232 | 241 | 242 |
| K | -1.5477E+01 | 2.1177E-09 | -1.8456E+00 |
| $a_4$ | 6.2032E-02 | -3.6938E-03 | -8.5109E-03 |
| $a_6$ | 3.6583E-04 | 7.2195E-04 | 8.1411E-05 |
| $a_8$ | 8.9051E-04 | 0.0000E+00 | 0.0000E+00 |
| $a_{10}$ | 0.0000E+00 | 0.0000E+00 | 0.0000E+00 |
| $a_{12}$ | 0.0000E+00 | 0.0000E+00 | 0.0000E+00 |
| $a_{14}$ | 0.0000E+00 | 0.0000E+00 | 0.0000E+00 |
| $a_{16}$ | 0.0000E+00 | 0.0000E+00 | 0.0000E+00 |

FIG.9

| f(Focus)=2.0630mm, HFOV(Half angular field of view)= 55.9467deg., System length=19.0065mm, Image height=3mm, Fno=2.4 | | | | | | | |
|---|---|---|---|---|---|---|---|
| Surface # | | Radius | Thickness | Refractive index | Abbe number | Focus | Material |
| - | Object | ∞ | ∞ | | | | |
| 311 | 1st lens element | 10.7249 | 1.0000_T1 | 1.489_n1 | 70.405_v1 | -26.6134 | glass |
| 312 | | 5.6983 | 1.3540_G12 | | | | |
| 321 | 2nd lens element | 5.9801 | 1.5340_T2 | 1.546_n2 | 56.114_v2 | -5.2564 | plastic |
| 322 | | 1.7635 | 3.8735_G23 | | | | |
| 331 | 3rd lens element | 13.4991 | 3.5169_T3 | 1.546_n3 | 56.114_v3 | 9.2847 | plastic |
| 332 | | -7.3698 | 0.1000_G34-TA | | | | |
| 300 | Aperture stop | 1.00E+18 | 1.0669_TA | | | | |
| 341 | 4th lens element | 14.4986 | 1.1860_T4 | 1.546_n4 | 56.114_v4 | 3.9832 | plastic |
| 342 | | -2.4844 | 0.1000_G45 | | | | |
| 351 | 5th lens element | 73.0049 | 1.1916_T5 | 1.775_n5 | 49.624_v5 | 3.1083 | glass |
| 352/361 | 6th lens element | -2.4745 | 1.1772_T6 | 1.775_n6 | 23.825_v6 | -2.5295 | glass |
| 362 | | 20.5526 | 2.9065_BFL | | | | |
| 370 | Image plane | ∞ | | | | | |

FIG.12

| Aspherical parameters | | | |
|---|---|---|---|
| Surface # | 321 | 322 | 331 |
| K | 6.5186E-02 | -9.5889E-01 | 4.9811E-09 |
| $a_4$ | -9.4784E-04 | 3.9791E-03 | -6.2642E-03 |
| $a_6$ | 0.0000E+00 | 0.0000E+00 | -7.0161E-04 |
| $a_8$ | 0.0000E+00 | 0.0000E+00 | 6.6874E-05 |
| $a_{10}$ | 0.0000E+00 | 0.0000E+00 | 0.0000E+00 |
| $a_{12}$ | 0.0000E+00 | 0.0000E+00 | 0.0000E+00 |
| $a_{14}$ | 0.0000E+00 | 0.0000E+00 | 0.0000E+00 |
| $a_{16}$ | 0.0000E+00 | 0.0000E+00 | 0.0000E+00 |
| Surface # | 332 | 341 | 342 |
| K | -7.8461E-09 | -1.3155E-10 | -1.9352E+00 |
| $a_4$ | 2.3913E-03 | -6.1307E-03 | -8.0240E-03 |
| $a_6$ | 5.5249E-04 | 3.7445E-04 | -1.3986E-04 |
| $a_8$ | 3.6227E-04 | 0.0000E+00 | 0.0000E+00 |
| $a_{10}$ | 0.0000E+00 | 0.0000E+00 | 0.0000E+00 |
| $a_{12}$ | 0.0000E+00 | 0.0000E+00 | 0.0000E+00 |
| $a_{14}$ | 0.0000E+00 | 0.0000E+00 | 0.0000E+00 |
| $a_{16}$ | 0.0000E+00 | 0.0000E+00 | 0.0000E+00 |

FIG.13

| \multicolumn{7}{|c|}{f(Focus)=1.6016mm, HFOV(Half angular field of view)= 62.3229deg., System length=19.5080mm, Image height=3mm, Fno=2.4} |||||||
|---|---|---|---|---|---|---|---|
| Surface # | | Radius | Thickness | Refractive index | Abbe number | Focus | Material |
| - | Object | ∞ | ∞ | | | | |
| 411 | 1st lens element | 19.4718 | 1.0000_T1 | 1.489_n1 | 70.405_v1 | -22.3723 | glass |
| 412 | | 6.8843 | 1.0304_G12 | | | | |
| 421 | 2nd lens element | 6.7188 | 0.8013_T2 | 1.546_n2 | 56.114_v2 | -5.79288 | plastic |
| 422 | | 2.0598 | 6.6202_G23 | | | | |
| 431 | 3rd lens element | 12.9780 | 3.6972_T3 | 1.546_n3 | 56.114_v3 | 8.9766 | plastic |
| 432 | | -7.0817 | 0.1000_G34-TA | | | | |
| 400 | Aperture stop | 1.00E+18 | 0.9504_TA | | | | |
| 441 | 4th lens element | 13.3542 | 0.8810_T4 | 1.546_n4 | 56.114_v4 | 3.6743 | plastic |
| 442 | | -2.3055 | 0.1200_G45 | | | | |
| 451 | 5th lens element | 28.2762 | 1.0995_T5 | 1.775_n5 | 49.624_v5 | 2.7605 | glass |
| 452/461 | 6th lens element | -2.2763 | 0.3000_T6 | 1.775_n6 | 23.825_v6 | -2.0381 | glass |
| 462 | | 7.8066 | 2.9080_BFL | | | | |
| 470 | Image plane | ∞ | | | | | |

FIG.16

| Aspherical parameters | | | |
|---|---|---|---|
| Surface # | 421 | 422 | 431 |
| K | -5.2788E-02 | -1.0054E+00 | 1.2849E-09 |
| $a_4$ | -5.1350E-04 | 2.4377E-03 | -6.5080E-03 |
| $a_6$ | 0.0000E+00 | 0.0000E+00 | -5.4026E-04 |
| $a_8$ | 0.0000E+00 | 0.0000E+00 | 6.2396E-05 |
| $a_{10}$ | 0.0000E+00 | 0.0000E+00 | 0.0000E+00 |
| $a_{12}$ | 0.0000E+00 | 0.0000E+00 | 0.0000E+00 |
| $a_{14}$ | 0.0000E+00 | 0.0000E+00 | 0.0000E+00 |
| $a_{16}$ | 0.0000E+00 | 0.0000E+00 | 0.0000E+00 |
| Surface # | 432 | 441 | 442 |
| K | -3.1309E+00 | -1.4236E-09 | -1.7939E+00 |
| $a_4$ | 4.6357E-03 | -7.9355E-03 | -9.1377E-03 |
| $a_6$ | 1.8195E-04 | 5.2959E-04 | -4.7102E-04 |
| $a_8$ | 9.1732E-04 | 0.0000E+00 | 0.0000E+00 |
| $a_{10}$ | 0.0000E+00 | 0.0000E+00 | 0.0000E+00 |
| $a_{12}$ | 0.0000E+00 | 0.0000E+00 | 0.0000E+00 |
| $a_{14}$ | 0.0000E+00 | 0.0000E+00 | 0.0000E+00 |
| $a_{16}$ | 0.0000E+00 | 0.0000E+00 | 0.0000E+00 |

FIG.17

| f(Focus)=1.8010mm, HFOV(Half angular field of view)= 59.5476deg., System length=23.3053mm, Image height=3mm, Fno=2.4 |||||||
|---|---|---|---|---|---|---|---|
| Surface # | | Radius | Thickness | Refractive index | Abbe number | Focus | Material |
| - | Object | ∞ | ∞ | | | | |
| 511 | 1st lens element | 17.1726 | 5.3775_T1 | 1.489_n1 | 70.405_v1 | -28.6863 | glass |
| 512 | | 6.9252 | 1.4111_G12 | | | | |
| 521 | 2nd lens element | 6.9330 | 1.9225_T2 | 1.546_n2 | 56.114_v2 | -4.8694 | plastic |
| 522 | | 1.7334 | 4.7196_G23 | | | | |
| 531 | 3rd lens element | 20.2786 | 2.4753_T3 | 1.546_n3 | 56.114_v3 | 10.84409 | plastic |
| 532 | | -8.0006 | 0.1749_G34-TA | | | | |
| 500 | Aperture stop | 1.00E+18 | 1.1029_TA | | | | |
| 541 | 4th lens element | 10.5800 | 1.3086_T4 | 1.546_n4 | 56.114_v4 | 3.8436 | plastic |
| 542 | | -2.5032 | 0.1200_G45 | | | | |
| 551 | 5th lens element | 62.2576 | 1.4876_T5 | 1.775_n5 | 49.624_v5 | 2.9212 | glass |
| 552/561 | 6th lens element | -2.3259 | 0.3000_T6 | 1.775_n6 | 23.825_v6 | -2.6694 | glass |
| 562 | | 115.1232 | 2.9053_BFL | | | | |
| 570 | Image plane | ∞ | | | | | |

FIG.20

| Aspherical parameters | | | |
|---|---|---|---|
| Surface # | 521 | 522 | 531 |
| K | -2.0620E-03 | -9.7464E-01 | 4.0566E-09 |
| $a_4$ | -6.5746E-04 | 4.9229E-03 | -8.3850E-03 |
| $a_6$ | 0.0000E+00 | 0.0000E+00 | -4.4752E-04 |
| $a_8$ | 0.0000E+00 | 0.0000E+00 | 8.4849E-05 |
| $a_{10}$ | 0.0000E+00 | 0.0000E+00 | 0.0000E+00 |
| $a_{12}$ | 0.0000E+00 | 0.0000E+00 | 0.0000E+00 |
| $a_{14}$ | 0.0000E+00 | 0.0000E+00 | 0.0000E+00 |
| $a_{16}$ | 0.0000E+00 | 0.0000E+00 | 0.0000E+00 |
| Surface # | 532 | 541 | 542 |
| K | 4.9668E-09 | 2.3898E-09 | -2.1464E+00 |
| $a_4$ | 1.2913E-03 | -5.7392E-03 | -8.7110E-03 |
| $a_6$ | 4.6976E-04 | 5.5741E-04 | 2.2395E-04 |
| $a_8$ | 3.8957E-04 | 0.0000E+00 | 0.0000E+00 |
| $a_{10}$ | 0.0000E+00 | 0.0000E+00 | 0.0000E+00 |
| $a_{12}$ | 0.0000E+00 | 0.0000E+00 | 0.0000E+00 |
| $a_{14}$ | 0.0000E+00 | 0.0000E+00 | 0.0000E+00 |
| $a_{16}$ | 0.0000E+00 | 0.0000E+00 | 0.0000E+00 |

FIG.21

| f(Focus)=1.8815mm, HFOV(Half angular field of view)= 58.3841deg., System length=20.5171mm, Image height=3mm, Fno=2.4 ||||||||
|---|---|---|---|---|---|---|---|
| Surface # | | Radius | Thickness | Refractive index | Abbe number | Focus | Material |
| - | Object | ∞ | ∞ | | | | |
| 611 | 1st lens element | 19.6611 | 2.5867_T1 | 1.489_n1 | 70.405_v1 | -28.2832 | glass |
| 612 | | 7.7662 | 0.2868_G12 | | | | |
| 621 | 2nd lens element | 6.8590 | 1.6844_T2 | 1.546_n2 | 56.114_v2 | -5.046 | plastic |
| 622 | | 1.7950 | 4.9748_G23 | | | | |
| 631 | 3rd lens element | 12.1950 | 3.0623_T3 | 1.546_n3 | 56.114_v3 | 9.93266 | plastic |
| 632 | | -8.8984 | 0.1078_G34-TA | | | | |
| 600 | Aperture stop | 1.00E+18 | 0.2957_TA | | | | |
| 641 | 4th lens element | 16.8054 | 2.5885_T4 | 1.546_n4 | 56.114_v4 | 4.9491 | plastic |
| 642 | | -3.0444 | 0.1200_G45 | | | | |
| 651 | 5th lens element | 12.4793 | 1.5931_T5 | 1.775_n5 | 49.624_v5 | 2.71458 | glass |
| 652/ 661 | 6th lens element | -2.3906 | 0.3000_T6 | 1.775_n6 | 23.825_v6 | -2.61538 | glass |
| 662 | | 35.3662 | 2.9171_BFL | | | | |
| 670 | Image plane | ∞ | | | | | |

FIG.24

| Aspherical parameters | | | |
|---|---|---|---|
| Surface # | 621 | 622 | 631 |
| K | 3.4429E-02 | -1.0385E+00 | 3.5710E-11 |
| $a_4$ | -6.0571E-04 | 5.1356E-03 | -6.7362E-03 |
| $a_6$ | 0.0000E+00 | 0.0000E+00 | -9.9129E-04 |
| $a_8$ | 0.0000E+00 | 0.0000E+00 | 9.7711E-05 |
| $a_{10}$ | 0.0000E+00 | 0.0000E+00 | 0.0000E+00 |
| $a_{12}$ | 0.0000E+00 | 0.0000E+00 | 0.0000E+00 |
| $a_{14}$ | 0.0000E+00 | 0.0000E+00 | 0.0000E+00 |
| $a_{16}$ | 0.0000E+00 | 0.0000E+00 | 0.0000E+00 |
| Surface # | 632 | 641 | 642 |
| K | -7.3608E-10 | -1.0696E-09 | -2.2729E+00 |
| $a_4$ | -4.2245E-03 | -4.6573E-03 | -4.1231E-03 |
| $a_6$ | 1.4279E-03 | 2.0658E-03 | 4.1753E-04 |
| $a_8$ | 2.9429E-04 | 0.0000E+00 | 0.0000E+00 |
| $a_{10}$ | 0.0000E+00 | 0.0000E+00 | 0.0000E+00 |
| $a_{12}$ | 0.0000E+00 | 0.0000E+00 | 0.0000E+00 |
| $a_{14}$ | 0.0000E+00 | 0.0000E+00 | 0.0000E+00 |
| $a_{16}$ | 0.0000E+00 | 0.0000E+00 | 0.0000E+00 |

FIG.25

| \multicolumn{7}{|c|}{f(Focus)=1.8978mm, HFOV(Half angular field of view)= 64.5344deg., System length=19.0838mm, Image height=3mm, Fno=2.6} |
|---|---|---|---|---|---|---|---|
| Surface # | | Radius | Thickness | Refractive index | Abbe number | Focus | Material |
| - | Object | ∞ | ∞ | | | | |
| 711 | 1st lens element | 17.6725 | 1.9050_T1 | 1.489_n1 | 70.405_v1 | -21.1275 | glass |
| 712 | | 6.2872 | 1.7199_G12 | | | | |
| 721 | 2nd lens element | 5.6580 | 1.6127_T2 | 1.546_n2 | 56.114_v2 | -5.30446 | plastic |
| 722 | | 1.7227 | 3.6116_G23 | | | | |
| 731 | 3rd lens element | 38.5936 | 3.5287_T3 | 1.546_n3 | 56.114_v3 | 7.81227 | plastic |
| 732 | | -4.6400 | 0.7663_G34-TA | | | | |
| 700 | Aperture stop | 1.00E+18 | 0.0798_TA | | | | |
| 741 | 4th lens element | 24.6011 | 1.0680_T4 | 1.546_n4 | 56.114_v4 | 4.22615 | plastic |
| 742 | | -2.5069 | 0.2378_G45 | | | | |
| 751 | 5th lens element | 2507.6424 | 0.9513_T5 | 1.746_n5 | 49.399_v5 | 6.4454 | glass |
| 752 | | -4.8170 | 0.0503_G56 | | | | |
| 761 | 6th lens element | -8.2086 | 0.6105_T6 | 1.760_n6 | 27.579_v6 | -4.2713 | glass |
| 762 | | 5.5439 | 2.9419_BFL | | | | |
| 770 | Image plane | ∞ | | | | | |

FIG.28

| Aspherical parameters | | | |
|---|---|---|---|
| Surface # | 721 | 722 | 731 |
| K | 0.0000E+00 | -8.7778E-01 | 0.0000E+00 |
| $a_4$ | -5.9661E-04 | 4.6239E-03 | -9.6063E-03 |
| $a_6$ | -1.9262E-05 | 2.2487E-04 | -7.5820E-04 |
| $a_8$ | 0.0000E+00 | 0.0000E+00 | 1.1157E-04 |
| $a_{10}$ | 0.0000E+00 | 0.0000E+00 | 0.0000E+00 |
| $a_{12}$ | 0.0000E+00 | 0.0000E+00 | 0.0000E+00 |
| $a_{14}$ | 0.0000E+00 | 0.0000E+00 | 0.0000E+00 |
| $a_{16}$ | 0.0000E+00 | 0.0000E+00 | 0.0000E+00 |
| Surface # | 732 | 741 | 742 |
| K | 0.0000E+00 | 0.0000E+00 | -3.2209E+00 |
| $a_4$ | 7.6900E-03 | -2.2859E-03 | -1.3588E-02 |
| $a_6$ | -2.1050E-04 | 2.9076E-03 | 3.6194E-03 |
| $a_8$ | 9.0240E-04 | 0.0000E+00 | 0.0000E+00 |
| $a_{10}$ | 0.0000E+00 | 0.0000E+00 | 0.0000E+00 |
| $a_{12}$ | 0.0000E+00 | 0.0000E+00 | 0.0000E+00 |
| $a_{14}$ | 0.0000E+00 | 0.0000E+00 | 0.0000E+00 |
| $a_{16}$ | 0.0000E+00 | 0.0000E+00 | 0.0000E+00 |

FIG.29

| f(Focus)=1.8490mm, HFOV(Half angular field of view)= 65.2053deg., System length=19.1349mm, Image height=3mm, Fno=2.4 ||||||||
|---|---|---|---|---|---|---|---|
| Surface # | | Radius | Thickness | Refractive index | Abbe number | Focus | Material |
| - | Object | ∞ | ∞ | | | | |
| 811 | 1st lens element | 17.0335 | 1.0000_T1 | 1.489_n1 | 70.405_v1 | -19.963 | glass |
| 812 | | 6.0840 | 1.6774_G12 | | | | |
| 821 | 2nd lens element | 5.6823 | 1.6035_T2 | 1.546_n2 | 56.114_v2 | -5.19393 | plastic |
| 822 | | 1.7031 | 3.4957_G23 | | | | |
| 831 | 3rd lens element | -105.3155 | 3.4559_T3 | 1.546_n3 | 56.114_v3 | 7.67199 | plastic |
| 832 | | -4.0749 | 0.4879_G34-TA | | | | |
| 800 | Aperture stop | 1.00E+18 | 1.1008_TA | | | | |
| 841 | 4th lens element | 15.4380 | 1.5076_T4 | 1.546_n4 | 56.114_v4 | 4.2219 | plastic |
| 842 | | -2.6160 | 0.1000_G45 | | | | |
| 851 | 5th lens element | 19.0543 | 1.3501_T5 | 1.775_n5 | 49.624_v5 | 3.96713 | glass |
| 852/861 | 6th lens element | -3.5545 | 0.6000_T6 | 1.775_n6 | 23.825_v6 | -2.83923 | glass |
| 862 | | 8.1926 | 2.7560_BFL | | | | |
| 870 | Image plane | ∞ | | | | | |

FIG.32

| Aspherical parameters | | | |
|---|---|---|---|
| Surface # | 821 | 822 | 831 |
| K | 0.0000E+00 | -9.6425E-01 | 0.0000E+00 |
| $a_4$ | -1.2628E-03 | 3.0920E-03 | -8.8697E-03 |
| $a_6$ | 0.0000E+00 | 0.0000E+00 | -6.1066E-04 |
| $a_8$ | 0.0000E+00 | 0.0000E+00 | 8.9697E-05 |
| $a_{10}$ | 0.0000E+00 | 0.0000E+00 | 0.0000E+00 |
| $a_{12}$ | 0.0000E+00 | 0.0000E+00 | 0.0000E+00 |
| $a_{14}$ | 0.0000E+00 | 0.0000E+00 | 0.0000E+00 |
| $a_{16}$ | 0.0000E+00 | 0.0000E+00 | 0.0000E+00 |
| Surface # | 832 | 841 | 842 |
| K | 0.0000E+00 | 0.0000E+00 | -2.6488E+00 |
| $a_4$ | 3.1981E-03 | -2.5081E-03 | -7.9491E-03 |
| $a_6$ | 3.8318E-04 | 3.6776E-04 | 7.0736E-04 |
| $a_8$ | -1.6028E-05 | 0.0000E+00 | 0.0000E+00 |
| $a_{10}$ | 0.0000E+00 | 0.0000E+00 | 0.0000E+00 |
| $a_{12}$ | 0.0000E+00 | 0.0000E+00 | 0.0000E+00 |
| $a_{14}$ | 0.0000E+00 | 0.0000E+00 | 0.0000E+00 |
| $a_{16}$ | 0.0000E+00 | 0.0000E+00 | 0.0000E+00 |

FIG.33

| f(Focus)=1.9314mm, HFOV(Half angular field of view)= 62.1817deg., System length=19.9589mm, Image height=3mm, Fno=2.6 ||||||||
|---|---|---|---|---|---|---|---|
| Surface # | | Radius | Thickness | Refractive index | Abbe number | Focus | Material |
| - | Object | ∞ | ∞ | | | | |
| 911 | 1st lens element | 19.4603 | 2.5000_T1 | 1.546_n1 | 56.114_v1 | -21.2945 | plastic |
| 912 | | 6.9476 | 1.7688_G12 | | | | |
| 921 | 2nd lens element | 5.9228 | 1.6555_T2 | 1.546_n2 | 56.114_v2 | -5.20469 | plastic |
| 922 | | 1.7307 | 3.6568_G23 | | | | |
| 931 | 3rd lens element | 37.4906 | 3.5287_T3 | 1.546_n3 | 56.114_v3 | 5.3584 | plastic |
| 932 | | -3.0675 | 0.7520_G34-TA | | | | |
| 900 | Aperture stop | 1.00E+18 | 0.3842_TA | | | | |
| 941 | 4th lens element | -13.3891 | 1.0698_T4 | 1.546_n4 | 56.114_v4 | 5.4667 | plastic |
| 942 | | -2.5093 | 0.1000_G45 | | | | |
| 951 | 5th lens element | 87.9996 | 1.1837_T5 | 1.746_n5 | 49.399_v5 | 4.04322 | glass |
| 952 | | -3.1055 | 0.0581_G56 | | | | |
| 961 | 6th lens element | -3.9499 | 0.6013_T6 | 1.760_n6 | 27.579_v6 | -3.0429 | glass |
| 962 | | 5.9486 | 2.6999_BFL | | | | |
| 970 | Image plane | ∞ | | | | | |

FIG.36

| Aspherical parameters | | | | |
|---|---|---|---|---|
| Surface # | 911 | 912 | 921 | 922 |
| K | 0.0000E+00 | 0.0000E+00 | 0.0000E+00 | -8.5885E-01 |
| $a_4$ | 5.8465E-05 | 5.3122E-06 | -7.0951E-04 | 5.1990E-03 |
| $a_6$ | 0.0000E+00 | 0.0000E+00 | -2.0229E-05 | 1.9200E-04 |
| $a_8$ | 0.0000E+00 | 0.0000E+00 | 0.0000E+00 | 0.0000E+00 |
| $a_{10}$ | 0.0000E+00 | 0.0000E+00 | 0.0000E+00 | 0.0000E+00 |
| $a_{12}$ | 0.0000E+00 | 0.0000E+00 | 0.0000E+00 | 0.0000E+00 |
| $a_{14}$ | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 |
| Surface # | 931 | 932 | 941 | 942 |
| K | 0.0000E+00 | 0.0000E+00 | 0.0000E+00 | -3.2656E+00 |
| $a_4$ | -1.0542E-02 | 7.5892E-03 | -2.9245E-03 | -1.1829E-02 |
| $a_6$ | -1.0886E-03 | 3.6317E-05 | 5.9771E-04 | 3.1122E-03 |
| $a_8$ | 8.2620E-05 | 1.3571E-05 | 0.0000E+00 | 0.0000E+00 |
| $a_{10}$ | 0.0000E+00 | 0.0000E+00 | 0.0000E+00 | 0.0000E+00 |
| $a_{12}$ | 0.0000E+00 | 0.0000E+00 | 0.0000E+00 | 0.0000E+00 |
| $a_{14}$ | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 |

FIG.37

| | Embodiment 1st | Embodiment 2nd | Embodiment 3rd | Embodiment 4th | Embodiment 5th | Embodiment 6th | Embodiment 7th | Embodiment 8th | Embodiment 9th |
|---|---|---|---|---|---|---|---|---|---|
| CT1 | 1.000 | 1.000 | 1.000 | 1.000 | 5.378 | 2.587 | 1.905 | 1.000 | 2.500 |
| AC12 | 3.256 | 0.103 | 1.354 | 1.030 | 1.411 | 0.287 | 1.720 | 1.677 | 1.769 |
| CT2 | 0.989 | 3.136 | 1.534 | 0.801 | 1.922 | 1.684 | 1.613 | 1.604 | 1.656 |
| AC23 | 4.070 | 3.068 | 3.873 | 6.620 | 4.720 | 4.975 | 3.612 | 3.496 | 3.657 |
| CT3 | 3.450 | 4.045 | 3.517 | 3.697 | 2.475 | 3.062 | 3.529 | 3.456 | 3.529 |
| AC34-TA | 1.075 | 0.869 | 1.067 | 0.95 | 1.103 | 0.296 | 0.08 | 1.101 | 0.384 |
| TA | 0.155 | 0.1 | 0.1 | 0.1 | 0.175 | 0.108 | 0.766 | 0.488 | 0.752 |
| CT4 | 1.096 | 1.459 | 1.186 | 0.881 | 1.309 | 2.588 | 1.068 | 1.508 | 1.070 |
| AC45 | 0.106 | 0.120 | 0.100 | 0.120 | 0.120 | 0.120 | 0.238 | 0.100 | 0.100 |
| CT5 | 1.011 | 1.782 | 1.192 | 1.099 | 1.488 | 1.593 | 0.951 | 1.350 | 1.184 |
| AC56 | 0.000 | 0.000 | 0.000 | 0.000 | 0.000 | 0.000 | 0.050 | 0.000 | 0.058 |
| CT6 | 0.300 | 0.300 | 1.177 | 0.300 | 0.300 | 0.300 | 0.610 | 0.600 | 0.601 |
| AAG | 8.662 | 4.260 | 6.494 | 8.821 | 7.529 | 5.785 | 6.466 | 6.862 | 6.720 |
| ALT | 7.845 | 11.721 | 9.606 | 7.779 | 12.871 | 11.815 | 9.676 | 9.517 | 10.539 |
| ALT/AAG | 0.906 | 2.752 | 1.479 | 0.882 | 1.710 | 2.042 | 1.497 | 1.387 | 1.568 |
| ALT/CT3 | 2.274 | 2.898 | 2.731 | 2.104 | 5.200 | 3.858 | 2.742 | 2.754 | 2.987 |
| (CT3+ALT)/AAG | 1.304 | 3.701 | 2.021 | 1.301 | 2.038 | 2.572 | 2.042 | 1.891 | 2.093 |
| AC23/CT5 | 4.025 | 1.722 | 3.251 | 6.021 | 3.173 | 3.123 | 3.797 | 2.589 | 3.089 |
| (CT3+AAG)/CT4 | 11.050 | 5.693 | 8.441 | 14.209 | 7.645 | 3.418 | 9.358 | 6.844 | 9.580 |
| AC23/CT4 | 3.713 | 2.103 | 3.266 | 7.514 | 3.607 | 1.922 | 3.382 | 2.319 | 3.418 |
| (CT2+CT3)/AAG | 0.512 | 1.686 | 0.778 | 0.510 | 0.584 | 0.820 | 0.795 | 0.737 | 0.771 |
| AC23/CT1 | 4.070 | 3.068 | 3.873 | 6.620 | 0.878 | 1.923 | 1.896 | 3.496 | 1.463 |
| AAG/CT6 | 28.872 | 14.200 | 5.517 | 29.403 | 25.095 | 19.284 | 10.591 | 11.436 | 11.176 |
| AAG/CT5 | 8.567 | 2.391 | 5.450 | 8.023 | 5.061 | 3.631 | 6.797 | 5.082 | 5.677 |
| AC23/CT6 | 13.567 | 10.226 | 3.290 | 22.067 | 15.732 | 16.583 | 5.916 | 5.826 | 6.082 |
| AC23/(AC45+CT1) | 3.679 | 2.739 | 3.521 | 5.911 | 0.859 | 1.838 | 1.685 | 3.178 | 1.406 |
| (CT2+CT3)/AC34 | 3.609 | 7.409 | 4.329 | 4.282 | 3.442 | 11.765 | 6.077 | 3.185 | 4.563 |
| (CT2+CT3)/(AC12+AC34) | 0.989 | 6.697 | 2.004 | 2.162 | 1.636 | 6.877 | 2.004 | 1.549 | 1.785 |
| CT3/CT6 | 11.499 | 13.482 | 2.988 | 12.324 | 8.251 | 10.208 | 5.780 | 5.760 | 5.868 |
| AAG/CT4 | 7.903 | 2.920 | 5.476 | 10.012 | 5.753 | 2.235 | 6.054 | 4.551 | 6.281 |

FIG.38

MOBILE DEVICE AND OPTICAL IMAGING LENS THEREOF

INCORPORATION BY REFERENCE

This application claims priority from R.O.C. Patent Application No. 103108712, filed on Mar. 12, 2014, the contents of which are hereby incorporated by reference in their entirety for all purposes.

TECHNICAL FIELD

The present invention relates to a camera device and an optical imaging lens thereof, and particularly, relates to a camera device applying an optical imaging lens having six lens elements and an optical imaging lens thereof.

BACKGROUND

The ever-increasing demand for smaller sized mobile devices, such as cell phones, digital cameras, etc. correspondingly triggered a growing need for a smaller sized photography module, comprising elements such as an optical imaging lens, a module housing unit, and an image sensor, etc., contained therein. Size reductions may be contributed from various aspects of the mobile devices, which includes not only the charge coupled device (CCD) and the complementary metal-oxide semiconductor (CMOS), but also the optical imaging lens mounted therein. When reducing the size of the optical imaging lens, however, achieving good optical characteristics becomes a challenging problem.

The length of conventional optical imaging lenses comprising four lens elements can be limited in a certain range; however, as the more and more demands in the market for high-end products, high-standard optical imaging lenses which show great quality with more pixels are required.

U.S. Pat. No. 7,663,814 disclosed an optical imaging lens constructed with an optical imaging lens having six lens elements. The length of the optical imaging lens, which, from the object-side surface of the first lens element to the image plane, is too long for smaller sized mobile devices.

Therefore, there is needed to develop optical imaging lens which is capable to place with six lens elements therein, with a shorter length, while also having good optical characteristics.

SUMMARY

An object of the present invention is to provide a camera device and an optical imaging lens thereof. With controlling the convex or concave shape of the surfaces, the length of the optical imaging lens is shortened and meanwhile the good optical characteristics, and system functionality are sustained.

In an exemplary embodiment, an optical imaging lens comprises, sequentially from an object side to an image side along an optical axis, comprises a first lens element, a second lens element, a third lens element, an aperture stop, a fourth lens element, a fifth lens element and a sixth lens element, each of the first, second, third, fourth, fifth and sixth lens elements having refracting power, an object-side surface facing toward the object side and an image-side surface facing toward the image side and a central thickness defined along the optical axis.

In the specification, parameters used here are: the central thickness of the first lens element, represented by T1, an air gap between the first lens element and the second lens element along the optical axis, represented by AC12, the central thickness of the second lens element, represented by T2, an air gap between the second lens element and the third lens element along the optical axis, represented by AC23, the central thickness of the third lens element, represented by T3, an air gap between the third lens element and the fourth lens element along the optical axis, represented by AC34, the distance between an aperture stop and the next lens element (which is the fourth lens element in the present invention) in the direction to the imaging plane, represented by TA, the central thickness of the fourth lens element, represented by T4, an air gap between the fourth lens element and the fifth lens element along the optical axis, represented by AC45, the central thickness of the fifth lens element, represented by T5, an air gap between the fifth lens element and the sixth lens element along the optical axis, represented by AC56, the central thickness of the sixth lens element, represented by T6, a distance between the image-side surface of the sixth lens element and the object-side surface of a filtering unit along the optical axis, represented by G6F, the central thickness of the filtering unit along the optical axis, represented by TF, a distance between the image-side surface of the filtering unit and an image plane along the optical axis, represented by GFP, a focusing length of the first lens element, represented by f1, a focusing length of the second lens element, represented by f2, a focusing length of the third lens element, represented by f3, a focusing length of the fourth lens element, represented by f4, a focusing length of the fifth lens element, represented by f5, a focusing length of the sixth lens element, represented by f6, the refracting power of the first lens element, represented by n1, the refracting power of the second lens element, represented by n2, the refracting power of the third lens element, represented by n3, the refracting power of the fourth lens element, represented by n4, the refracting power of the fifth lens element, represented by n5, the refracting power of the sixth lens element, represented by n6, an abbe number of the first lens element, represented by v1, an abbe number of the second lens element, represented by v2, an abbe number of the third lens element, represented by v3, an abbe number of the fourth lens element, represented by v4, an abbe number of the fifth lens element, represented by v5, an abbe number of the sixth lens element, represented by v6, an effective focal length of the optical imaging lens, represented by EFL, the length between the object-side surface of the first lens element and the image plane along the optical axis, represented by TTL, a sum of the central thicknesses of all six lens elements, comprising T1, T2, T3 T4, T4 and T6, represented by ALT, a sum of all five air gaps from the first lens element to the sixth lens element along the optical axis, represented by AAG, and a back focal length of the optical imaging lens, which is defined as the distance from the image-side surface of the sixth lens element to the image plane along the optical axis comprising G6F, TF and GFP and represented by BFL.

In an exemplary embodiment, the object-side surface of the first lens element comprises a convex portion in a vicinity of the optical axis; the object-side surface of the second lens element comprises a convex portion in a vicinity of the optical axis; the image-side surface of the fourth lens element comprises a convex portion in a vicinity of a periphery of the fourth lens element; the object-side surface of the fifth lens element comprises a convex portion in a vicinity of a periphery of the fifth lens element; the object-side surface of the sixth lens element comprises a concave portion in a vicinity of the optical axis; and the optical imaging lens comprises no other lenses having reflecting power beyond the six lens elements.

In another exemplary embodiment, other equation(s), such as those relating to the ratio among parameters could be taken into consideration. For example, ALT and AAG could be controlled to satisfy the equation as follows:

$ALT/AAG \leq 2.8$    Equation (1); or

CT3 and ALT could be controlled to satisfy the equation as follows:

$ALT/CT3 \leq 5.6$    Equation (2); or

CT3, ALT and AAG could be controlled to satisfy the equation as follows:

$1.3 \leq (CT3+ALT)/AAG$    Equation (3); or

CT5 and AC23 could be controlled to satisfy the equation as follows:

$1.5 \leq AC23/CT5$    Equation (4); or

CT3, CT4 and AAG could be controlled to satisfy the equation as follows:

$3.35 \leq (CT3+AAG)/CT4$    Equation (5); or

CT4 and AC23 could be controlled to satisfy the equation as follows:

$1.5 \leq AC23/CT4$    Equation (6); or

CT2, CT3 and AAG could be controlled to satisfy the equation as follows:

$0.5 \leq (CT2+CT3)/AAG$    Equation (7); or

CT1 and AC23 could be controlled to satisfy the equation as follows:

$1.1 \leq AC23/CT1$    Equation (8); or

CT6 and AAG could be controlled to satisfy the equation as follows:

$5.5 \leq AAG/CT6$    Equation (9); or

CT5 and AAG could be controlled to satisfy the equation as follows:

$2.0 \leq AAG/CT5$    Equation (10); or

CT6 and AC23 could be controlled to satisfy the equation as follows:

$3.0 \leq AC23/CT6$    Equation (11); or

CT1, AC23 and AC45 could be controlled to satisfy the equation as follows:

$1.1 \leq AC23/(AC45+CT1)$    Equation (12); or

CT2, CT3 and AC34 could be controlled to satisfy the equation as follows:

$3.0 \leq (CT2+CT3)/AC34$    Equation (13); or

CT2, CT3, AC12 and AC34 could be controlled to satisfy the equation as follows:

$1.2 \leq (CT2+CT3)/(AC12+AC34)$    Equation (14); or

CT3 and CT6 could be controlled to satisfy the equation as follows:

$2.95 \leq CT3/CT6$    Equation (15); or

CT4 and AAG could be controlled to satisfy the equation as follows:

$2.9 \leq AAG/CT4$    Equation (16).

Aforesaid exemplary embodiments are not limited and could be selectively incorporated in other embodiments described herein.

In some exemplary embodiments, more details about the convex or concave surface structure, refracting power and/or the position of an aperture stop could be incorporated for one specific lens element or broadly for plural lens elements to enhance the control for the system performance and/or resolution. It is noted that the details listed here could be incorporated in example embodiments if no inconsistency occurs.

In another exemplary embodiment, a camera device comprising a housing and a photography module positioned in the housing is provided. The photography module comprises any of aforesaid example embodiments of optical imaging lens, a lens barrel, a module housing unit and an image sensor. The lens barrel is for positioning the optical imaging lens, the module housing unit is for positioning the lens barrel, and the image sensor is positioned at the image side of the optical imaging lens.

Through controlling the convex or concave shape of the surfaces and/or the refraction power of the lens element(s), the camera device and the optical imaging lens thereof in exemplary embodiments achieve good optical characters and effectively broaden the shot angle of the optical imaging lens.

BRIEF DESCRIPTION OF THE DRAWINGS

Exemplary embodiments will be more readily understood from the following detailed description when read in conjunction with the appended drawing, in which:

FIG. 4 is a table of optical data for each lens element of a first embodiment of an optical imaging lens according to the present disclosure;

FIG. 5 is a table of aspherical data of a first embodiment of the optical imaging lens according to the present disclosure;

FIG. 8 is a table of optical data for each lens element of the optical imaging lens of a second embodiment of the present disclosure;

FIG. 9 is a table of aspherical data of a second embodiment of the optical imaging lens according to the present disclosure;

FIG. 12 is a table of optical data for each lens element of the optical imaging lens of a third embodiment of the present disclosure;

FIG. 13 is a table of aspherical data of a third embodiment of the optical imaging lens according to the present disclosure;

FIG. 16 is a table of optical data for each lens element of the optical imaging lens of a fourth embodiment of the present disclosure;

FIG. 17 is a table of aspherical data of a fourth embodiment of the optical imaging lens according to the present disclosure;

FIG. 20 is a table of optical data for each lens element of the optical imaging lens of a fifth embodiment of the present disclosure;

FIG. 21 is a table of aspherical data of a fifth embodiment of the optical imaging lens according to the present disclosure;

FIG. 24 is a table of optical data for each lens element of the optical imaging lens of a sixth embodiment of the present disclosure;

FIG. 25 is a table of aspherical data of a sixth embodiment of the optical imaging lens according to the present disclosure;

FIG. 28 is a table of optical data for each lens element of the optical imaging lens of a seventh embodiment of the present disclosure;

FIG. 29 is a table of aspherical data of a seventh embodiment of the optical imaging lens according to the present disclosure;

FIG. 32 is a table of optical data for each lens element of the optical imaging lens of an eighth embodiment of the present disclosure;

FIG. 33 is a table of aspherical data of an eighth embodiment of the optical imaging lens according to the present disclosure;

FIG. 36 is a table of optical data for each lens element of the optical imaging lens of an ninth embodiment of the present disclosure;

FIG. 37 is a table of aspherical data of an ninth embodiment of the optical imaging lens according to the present disclosure;

FIG. 38 is a table for the values of CT1, AC12, CT2, AC23, CT3, TA, AC34-TA, CT4, AC45, CT5, AC56, CT6, AAG, ALT, ALT/AAG, ALT/CT3, (CT3+ALT)/AAG, AC23/CT5, (CT3+AAG)/CT4, AC23/CT4, (CT2+CT3)/AAG, AC23/CT1, AAG/CT6, AAG/CT5, AC23/CT6, AC23/(AC45+CT1), (CT2+CT3)/AC34, (CT2+CT3)/(AC12+AC34), CT3/CT6 and AAG/CT4 of all nine example embodiments;

DETAILED DESCRIPTION

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present invention. Furthermore, the terminology as used herein is for the purpose of describing example embodiments only and is not intended to be a limitation of the invention. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

Figure 1:
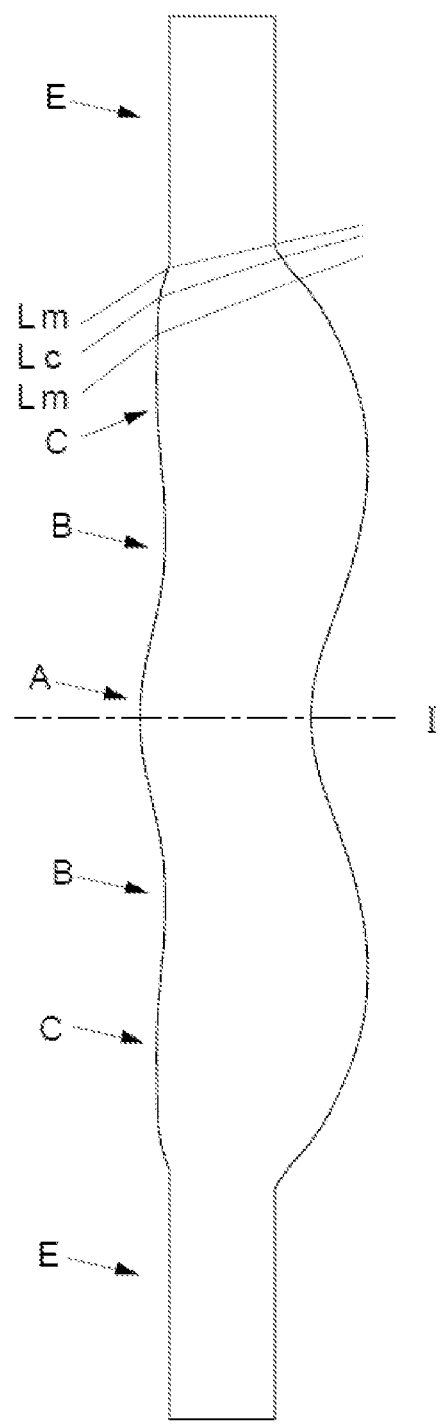
FIG. 1 is a cross-sectional view of one single lens element according to the present disclosure.

Here in the present specification, "a lens element having positive refracting power (or negative refracting power)" means that the lens element has positive refracting power (or negative refracting power) in the vicinity of the optical axis. "An object-side (or image-side) surface of a lens element comprises a convex (or concave) portion in a specific region" means that the object-side (or image-side) surface of the lens element "protrudes outwardly (or depresses inwardly)" along the direction parallel to the optical axis at the specific region, compared with the outer region radially adjacent to the specific region. Taking FIG. 1 for example, the lens element shown therein is radially symmetric around the optical axis which is labeled by I. The object-side surface of the lens element comprises a convex portion at region A, a concave portion at region B, and another convex portion at region C. This is because compared with the outer region radially adjacent to the region A (i.e. region B), the object-side surface protrudes outwardly at the region A, compared with the region C, the object-side surface depresses inwardly at the region B, and compared with the region E, the object-side surface protrudes outwardly at the region C. Here, "in a vicinity of a periphery of a lens element" means that in a vicinity of the peripheral region of a surface for passing imaging light on the lens element, i.e. the region C as shown in FIG. 1. The imaging light comprises chief ray Lc and marginal ray Lm. "In a vicinity of the optical axis" means that in a vicinity of the optical axis of a surface for passing the imaging light on the lens element, i.e. the region A as shown in FIG. 1. Further, a lens element could comprise an extending portion E for mounting the lens element in an optical imaging lens. Ideally, the imaging light would not pass the extending portion E. Here the extending portion E is only for example, the structure and shape thereof are not limited to this specific example. Please also noted that the extending portion of all the lens elements in the example embodiments shown below are skipped for maintaining the drawings clean and concise.

In the present invention, examples of an optical imaging lens which is a prime lens are provided. Example embodiments of an optical imaging lens may comprise a first lens element, a second lens element, a third lens element, a fourth lens element, a fifth lens element and a sixth lens element, each of the lens elements comprises refracting power, an object-side surface facing toward an object side and an image-side surface facing toward an image side. These lens elements may be arranged sequentially from the object side to the image side along an optical axis, and example embodiments of the lens as a whole may comprise only the six lens elements having refracting power. Through controlling the convex or concave shape of the surfaces and/or the refraction power of the lens element(s), the camera device and the optical imaging lens thereof in exemplary embodiments achieve good optical characters and effectively shorten the length of the optical imaging lens. In an example embodiment: the object-side surface of the first lens element comprises a convex portion in a vicinity of the optical axis; the object-side surface of the second lens element comprises a convex portion in a vicinity of the optical axis; the image-side surface of the fourth lens element comprises a convex portion in a vicinity of a periphery of the fourth lens element; the object-side surface of the fifth lens element comprises a convex portion in a vicinity of a periphery of the fifth lens element; the object-side surface of the sixth lens element comprises a concave portion in a vicinity of the optical axis; and the optical imaging lens comprises no other lenses having reflecting power beyond the six lens elements.

Preferably, the lens elements are designed in light of the optical characteristics and the length of the optical imaging lens. For example, combining the convex portions in a vicinity of the optical axis formed on the object-side surface of the first lens element, the convex portion in a vicinity of a periphery of the second lens element formed on the object-side surface thereof, the convex portion in a vicinity of a periphery of the fourth lens element formed on the image-side surface thereof, the convex portion in a vicinity of a periphery of the fifths lens element formed on the object-side surface thereof and the concave portion in a vicinity of the optical axis formed on the object-side surface of the sixth lens element, the aberration of the optical imaging lens could be further adjusted and meanwhile good optical performance could be sustained.

In another exemplary embodiment, some equation(s) of parameters, such as those relating to the ratio among parameters could be taken into consideration. For example, ALT and AAG could be controlled to satisfy the equation as follows:

$$ALT/AAG \leq 2.8 \qquad \text{Equation (1); or}$$

CT3 and ALT could be controlled to satisfy the equation as follows:

$$ALT/CT3 \leq 5.6 \qquad \text{Equation (2); or}$$

CT3, ALT and AAG could be controlled to satisfy the equation as follows:

$$1.3 \leq (CT3+ALT)/AAG \qquad \text{Equation (3); or}$$

CT5 and AC23 could be controlled to satisfy the equation as follows:

$$1.5 \leq AC23/CT5 \qquad \text{Equation (4); or}$$

CT3, CT4 and AAG could be controlled to satisfy the equation as follows:

$$3.35 \leq (CT3+AAG)/CT4 \qquad \text{Equation (5); or}$$

CT4 and AC23 could be controlled to satisfy the equation as follows:

$$1.5 \leq AC23/CT4 \qquad \text{Equation (6); or}$$

CT2, CT3 and AAG could be controlled to satisfy the equation as follows:

$$0.5 \leq (CT2+CT3)/AAG \qquad \text{Equation (7); or}$$

CT1 and AC23 could be controlled to satisfy the equation as follows:

$$1.1 \leq AC23/CT1 \qquad \text{Equation (8); or}$$

CT6 and AAG could be controlled to satisfy the equation as follows:

$$5.5 \leq AAG/CT6 \qquad \text{Equation (9); or}$$

CT5 and AAG could be controlled to satisfy the equation as follows:

$$2.0 \leq AAG/CT5 \qquad \text{Equation (10); or}$$

CT6 and AC23 could be controlled to satisfy the equation as follows:

$$3.0 \leq AC23/CT6 \qquad \text{Equation (11); or}$$

CT1, AC23 and AC45 could be controlled to satisfy the equation as follows:

$$1.1 \leq AC23/(AC45+CT1) \qquad \text{Equation (12); or}$$

CT2, CT3 and AC34 could be controlled to satisfy the equation as follows:

$$3.0 \leq (CT2+CT3)/AC34 \qquad \text{Equation (13); or}$$

CT2, CT3, AC12 and AC34 could be controlled to satisfy the equation as follows:

$$1.2 \leq (CT2+CT3)/(AC12+AC34) \qquad \text{Equation (14); or}$$

CT3 and CT6 could be controlled to satisfy the equation as follows:

$$2.95 \leq CT3/CT6 \qquad \text{Equation (15); or}$$

CT4 and AAG could be controlled to satisfy the equation as follows:

$$2.9 \leq AAG/CT4 \qquad \text{Equation (16).}$$

Aforesaid exemplary embodiments are not limited and could be selectively incorporated in other embodiments described herein.

Reference is now made to Equations (1) and (2). Considering that the shortening of the value of ALT, which is dominant to the length of the optical imaging lens, would effectively assist in shortening the length of the optical imaging lens, the value of ALT/AAG and ALT/CT3 are desired for small values. Here the value of ALT/AAG is suggested to be smaller or equal to 2.8 and preferably within 0.8~2.8; and ALT/AAG is suggested smaller or equal to 5.6 and preferably to be within 2~5.6.

Reference is now made to Equations (3), (5), (7), (9), (10) and (14). Considering that the shortening of the value of AAG, which is the sum of all air gaps between the lens elements, would effectively assist in shortening the length of the optical imaging lens, here the value of (CT3+ALT)/AAG and (CT2+CT3)/AAG are suggested for lower limits to satisfy Equations (3) and (7). However, further considering the assembly difficulty and light path, both of which requires for a certain gap between lens elements to sustain the imaging quality, (CT3+AAG)/CT4, AAG/CT6, AAG/CT5 and AAG/CT4 are suggested for lower limits to satisfy Equations (5), (9), (10) and (16). Preferably, the value of (CT3+AAG)/CT4 is suggested to be within 3.35~15; the value of AAG/CT6 is suggested to be within 5.5~30; the value of AAG/CT5 is suggested to be within 2~8.8; and the value of AAG/CT4 is suggested to be within 2.9~12.

Reference is now made to Equations (4), (6), (8), (11) and (12). Considering that it is required for comparative greater air gap between the second lens element, which has a comparative greater effective diameter for passing light, and the third lens element, which has a comparative smaller effective diameter for passing light, for passing light there between onto a proper level when entering to sustain good imaging quality, the value of AC23 requires for a proper value, therefore the values of AC23/CT5, AC23/T4, AC23/CT1, AC23/CT6 and AC23/(CT1+AC45) are suggested for lower limits to satisfy Equations (4), (6), (8), (11) and (12). Preferably, the value of AC23/CT5 is suggested to be within 1.5~6.5; the value of AC23/T4 is suggested to be within 5.5~30; the value of AC23/CT1 is suggested to be within 1.1~7; the value of AC23/CT6 is suggested to be within 3~25; and the value of AC23/(CT1+AC45) is suggested to be within 1.1~6.5.

Reference is now made to Equations (13), (14) and (15). Considering that the values of T3 require for a greater value than that of T2 for facilitating production process, the values of CT3/CT6, (CT2+CT3)/AC34 and (CT2+CT3)/(AC12+AC34) are suggested for lower limits to satisfy Equations (13), (14) and (15). Preferably, the value of CT3/CT6 is suggested to be within 2.95~15; the value of (CT2+CT3)/AC34 is suggested to be within 3~12; and the value of (CT2+CT3)/(AC12+AC34) is suggested to be within 1.2~7.

In light of the unpredictability in an optical system, in the present invention, satisfying these equations listed above may preferably shortening the length of the optical imaging lens, lowering the f-number, enlarging the shot angle, promoting the imaging quality and/or increasing the yield in the assembly process.

When implementing example embodiments, more details about the convex or concave surface, refracting power and/or the position of an aperture stop could be incorporated for one specific lens element or broadly for plural lens elements to enhance the control for the system performance and/or resolution. It is noted that the details listed here could be incorporated in example embodiments if no inconsistency occurs.

Figure 2:
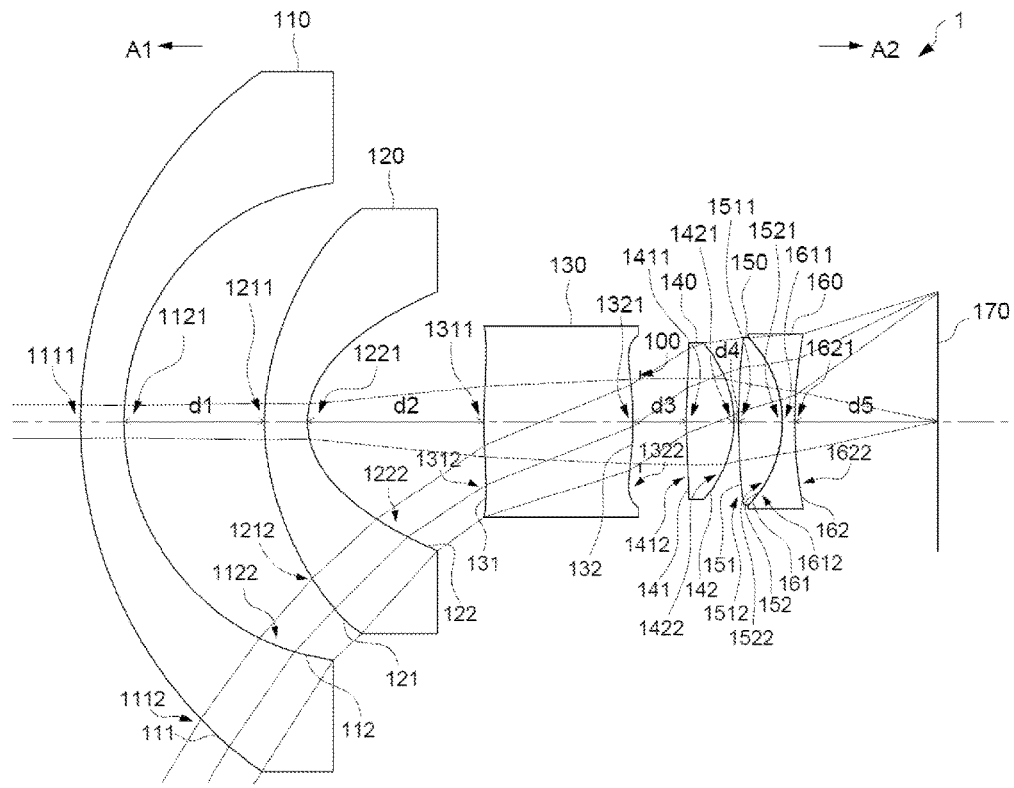
FIG. 2 is a cross-sectional view of a first embodiment of an optical imaging lens having six lens elements according to the present disclosure.
Figure 3:
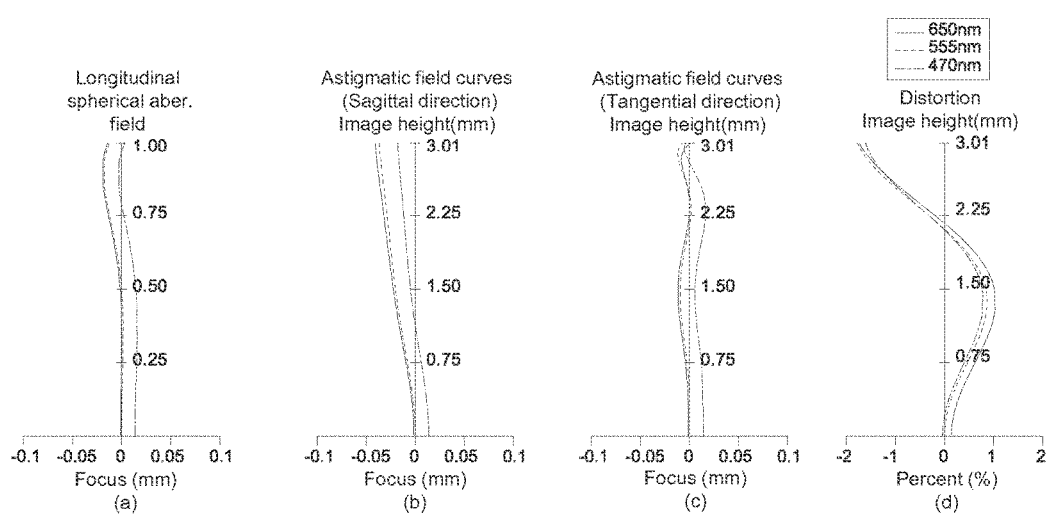
FIG. 3 is a chart of longitudinal spherical aberration and other kinds of optical aberrations of a first embodiment of the optical imaging lens according to the present disclosure.

Several exemplary embodiments and associated optical data will now be provided for illustrating example embodiments of optical imaging lens with good optical characters and a broadened shot angle. Reference is now made to FIGS. 2-5. FIG. 2 illustrates an example cross-sectional view of an optical imaging lens 1 having six lens elements of the optical imaging lens according to a first example embodiment. FIG. 3 shows example charts of longitudinal spherical aberration and other kinds of optical aberrations of the optical imaging lens 1 according to an example embodiment. FIG. 4 illustrates an example table of optical data of each lens element of the optical imaging lens 1 according to an example embodiment, in which a focal length of the optical imaging lens is labelled as "f". FIG. 5 depicts an example table of aspherical data of the optical imaging lens 1 according to an example embodiment.

As shown in FIG. 2, the optical imaging lens 1 of the present embodiment comprises, in order from an object side A1 to an image side A2 along an optical axis, a first lens element 110, a second lens element 120, a third lens element 130, an aperture stop 100, a fourth lens element 140, a fifth lens element 150 and a sixth lens element 160. A filtering unit 170 and an image plane 170 of an image sensor are positioned at the image side A2 of the optical lens 1. Each of the first, second, third, fourth, fifth and sixth lens elements 110, 120, 130, 140, 150, 160 and the filtering unit 170 comprises an object-side surface 111/121/131/141/151/161/171 facing toward the object side A1 and an image-side surface 112/122/132/142/152/162/172 facing toward the image side A2. An image plane 170 of an image sensor is positioned at the image side A2 of the optical imaging lens 1.

Exemplary embodiments of the optical imaging lens 1, wherein the first and sixth lens elements 110, 160 which may be constructed by glass material, and the second, third, fourth and fifth lens elements 120, 130, 140, 150 which may be constructed by plastic material which can help reducing the weight of the image lens, will now be described with reference to the drawings.

An example embodiment of the first lens element 110 has negative refracting power. The object-side surface 111 is a convex surface comprising a convex portion 1111 in a vicinity of the optical axis and a convex portion 1112 in a vicinity of a periphery of the first lens element 110. The image-side surface 112 is a concave surface comprising a concave portion 1121 in a vicinity of the optical axis and a concave portion 1122 in a vicinity of the periphery of the first lens element 110.

An example embodiment of the second lens element 120 has negative refracting power. The object-side surface 121 is a convex surface comprising a convex portion 1211 in a vicinity of the optical axis and a convex portion 1212 in a vicinity of a periphery of the second lens element 120. The image-side surface 122 is a concave surface comprising a concave portion 1221 in a vicinity of the optical axis and a concave portion 1222 in a vicinity of the periphery of the second lens element 120.

An example embodiment of the third lens element 130 has positive refracting power. The object-side surface 131 comprises a convex portion 1311 in a vicinity of the optical axis and a concave portion 1312 in a vicinity of a periphery of the third lens element 130. The image-side surface 132 is a convex surface comprising a convex portion 1321 in a vicinity of the optical axis and a convex portion 1322 in a vicinity of the periphery of the third lens element 130.

An example embodiment of the fourth lens element 140 has positive refracting power. The object-side surface 141 is a convex surface comprising a convex portion 1411 in a vicinity of the optical axis and a convex portion 1412 in a vicinity of a periphery of the fourth lens element 140. The image-side surface 142 is a convex surface comprising a convex portion 1421 in a vicinity of the optical axis and a convex portion 1422 in a vicinity of the periphery of the fourth lens element 140.

An example embodiment of the fifth lens element 150 has positive refracting power. The object-side surface 151 is a convex surface comprising a convex portion 1511 in a vicinity of the optical axis and a convex portion 1512 in a vicinity of a periphery of the fifth lens element 150. The image-side surface 152 is a convex surface comprising a convex portion 1521 in a vicinity of the optical axis and a convex portion 1522 in a vicinity of the periphery of the fifth lens element 150.

An example embodiment of the sixth lens element 160 has negative refracting power. The object-side surface 161 is a concave surface comprising a concave portion 1611 in a vicinity of the optical axis and a concave portion 1612 in a vicinity of a periphery of the sixth lens element 160. The image-side surface 162 is a concave surface comprising a concave portion 1621 in a vicinity of the optical axis and a concave portion 1622 in a vicinity of the periphery of the sixth lens element 160.

In example embodiments, the profiles of opposite surfaces of two adjacent lens elements, such as the image-side surface 152 of the fifth lens element 150 and the object-side surface 161 of the sixth lens element 160, may correspond to each other to eliminate air gap there between. Except this position, air gaps exist between the lens elements 110, 120, 130, 140, 150, 160, the filtering unit 170 and the image plane 170 of the image sensor. For example, FIG. 1 illustrates the air gap d1 existing between the first lens element 110 and the second lens element 120, the air gap d2 existing between the second lens element 120 and the third lens element 130, the air gap d3 existing between the third lens element 130 and the fourth lens element 140, the air gap d4 existing between the fourth lens element 140 and the fifth lens element 150, the air gap d5 existing between the sixth lens element 160 and the image plane 170 of the image sensor. However, in other embodiments, any of the aforesaid air gaps may not exist or air gap may exist between the image-side surface 152 of the fifth lens element 150 and the object-side surface 161 of the sixth lens element 160. The air gap d1 is denoted by AC12, the air gap d2 is denoted by AC23, the air gap d3 is denoted by AC34, the air gap d4 is denoted by AC45 and the sum of d1, d2, d3 and d4 is denoted by AAG.

FIG. 4 depicts the optical characteristics of each lens elements in the optical imaging lens 1 of the present embodiment, and please refer to FIG. 38 for the values of CT1, AC12, CT2, AC23, CT3, TA, AC34-TA, CT4, AC45, CT5, AC56, CT6, AAG, ALT, ALT/AAG, ALT/CT3, (CT3+ALT)/AAG, AC23/CT5, (CT3+AAG)/CT4, AC23/CT4, (CT2+CT3)/AAG, AC23/CT1, AAG/CT6, AAG/CT5, AC23/CT6, AC23/(AC45+CT1), (CT2+CT3)/AC34, (CT2+CT3)/(AC12+AC34), CT3/CT6 and AAG/CT4 of the present embodiment.

The optical imaging lens 1 which shows that the distance from the object-side surface 111 of the first lens element 110 to the image plane 170 along the optical axis is 19.8095 mm, and the length of the optical imaging lens 1 is shortened, compared with that of the conventional optical imaging lens. Additionally, the HFOV of the optical imaging lens 1 is 58.7408, which is better than that of the conventional optical imaging lens, and this is capable to enlarge the shot angle.

The object-side surface 141 and the image-side surface 142 of the fourth lens element 110 which is constructed by glass material are spherical surfaces. The aspherical surfaces, including the object-side surface 111 and the image-side surface 112 of the first lens element 110, the object-side surface 121 and the image-side surface 122 of the second lens element 120, the object-side surface 131 and the image-side surface 132 of the third lens element 130 and the object-side surface 151 and the image-side surface 152 of the fifth lens element 150, the object-side surface 161 and the image-side surface 162 of the sixth lens element 160, are all defined by the following aspherical formula.

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i}$$

wherein,

R represents the radius of curvature of the surface of the lens element;

Z represents the depth of the aspherical surface (the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant;

$a_{2i}$ represents an aspherical coefficient of $2i^{th}$ level.

The values of each aspherical parameter are shown in FIG. 5.

As illustrated in FIG. 3, longitudinal spherical aberration (a), the curves of different wavelengths are closed to each other. This represents off-axis light with respect to these wavelengths is focused around an image point. From the vertical deviation of each curve shown therein, the offset of the off-axis light relative to the image point is within ±0.05 mm. Therefore, the present embodiment improves the longitudinal spherical aberration with respect to different wavelengths.

Please refer to FIG. 3, astigmatism aberration in the sagittal direction (b) and astigmatism aberration in the tangential direction (c). The focus variation with respect to the three wavelengths in the whole field falls within ±0.05 mm. This reflects the optical imaging lens 1 of the present embodiment eliminates aberration effectively. Additionally, the closed curves represents dispersion is improved.

Please refer to FIG. 3, distortion aberration (d), which showing the variation of the distortion aberration is within ±2.0%.

Therefore, the optical imaging lens 1 of the present embodiment shows great characteristics in the longitudinal spherical aberration, astigmatism in the sagittal direction, astigmatism in the tangential direction, and distortion aberration. According to above illustration, the optical imaging lens 1 of the example embodiment indeed achieves great optical performance and the length of the optical imaging lens 1 is effectively shortened.

Figure 6:
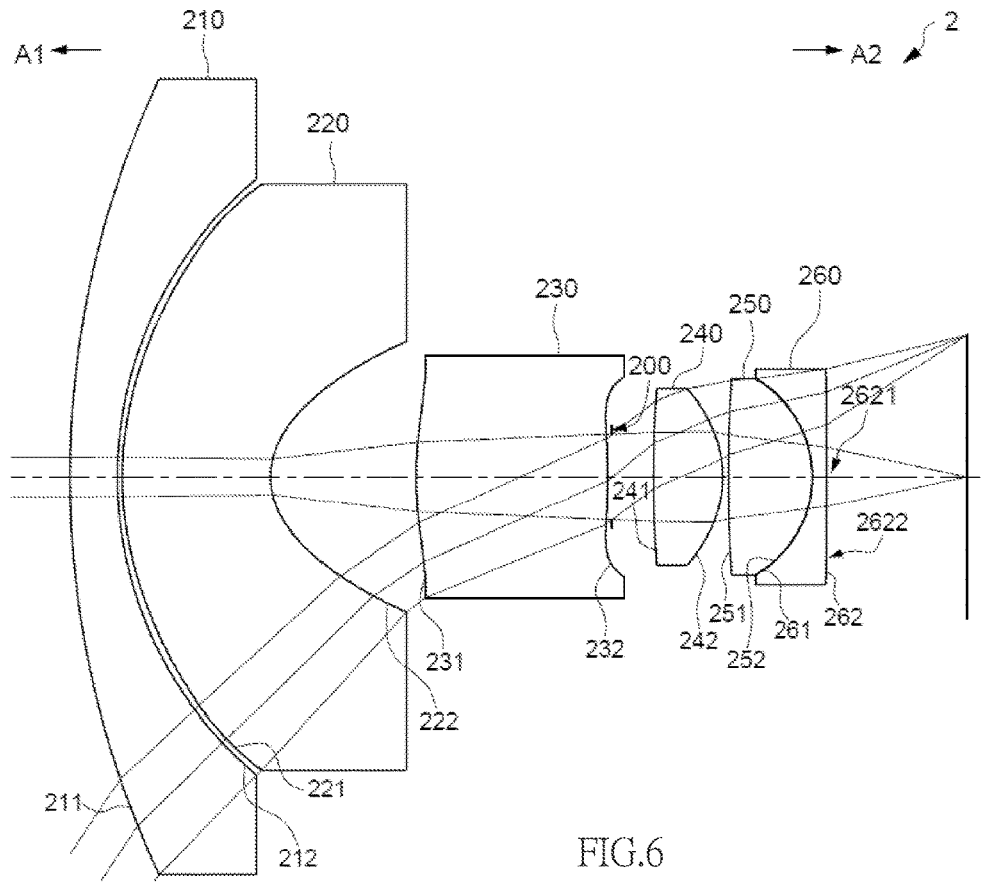
FIG. 6 is a cross-sectional view of a second embodiment of an optical imaging lens having six lens elements according to the present disclosure.
Figure 7:
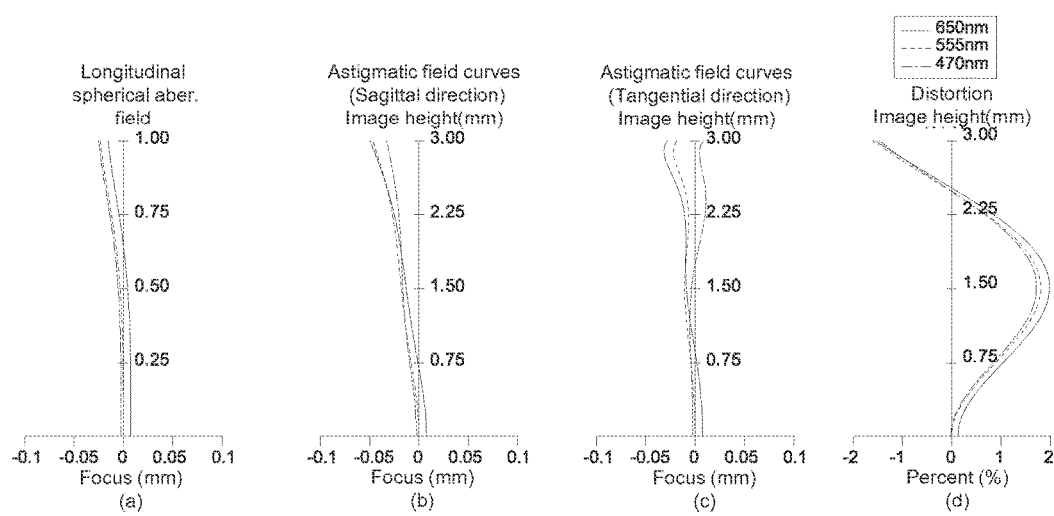
FIG. 7 is a chart of longitudinal spherical aberration and other kinds of optical aberrations of a second embodiment of the optical imaging lens according to the present disclosure.

Reference is now made to FIGS. 6-9. FIG. 6 illustrates an example cross-sectional view of an optical imaging lens 2 having six lens elements of the optical imaging lens according to a second example embodiment. FIG. 7 shows example charts of longitudinal spherical aberration and other kinds of optical aberrations of the optical imaging lens 2 according to the second example embodiment. FIG. 8 shows an example table of optical data of each lens element of the optical imaging lens 2 according to the second example embodiment. FIG. 9 shows an example table of aspherical data of the optical imaging lens 2 according to the second example embodiment. The reference numbers labeled in the present embodiment are similar to those in the first embodiment for the similar elements, but here the reference numbers are initialed with 2, for example, reference number 231 for labeling the object-side surface of the third lens element 230, reference number 232 for labeling the image-side surface of the third lens element 230, etc.

As shown in FIG. 6, the optical imaging lens 2 of the present embodiment, in an order from an object side A1 to an image side A2 along an optical axis, comprises a first lens element 210, a second lens element 220, a third lens element 230, an aperture stop 200, a fourth lens element 240, a fifth lens element 250 and a sixth lens element 260.

The differences between the second embodiment and the first embodiment are the radius of curvature and thickness of each lens element, the distance of each air gap and the configuration of the concave/convex shape of the image-side surface 262, but the configuration of the positive/negative refracting power of the first, second, third, fourth, fifth and sixth lens elements 210, 220, 230, 240, 250, 260 and configuration of the concave/convex shape of surfaces, comprising the object-side surfaces 211, 221, 231, 241, 251, 261 facing to the object side A1 and the image-side surfaces 212, 222, 232, 242, 252 facing to the image side A2, are similar to those in the first embodiment. Here, for clearly showing the drawings of the present embodiment, only the surface shapes which are different from that in the first embodiment are labeled. Specifically, the difference between the present and first embodiments is: the image-side surface 262 of the sixth lens element 260 is a convex surface comprising a convex portion 2621 in a vicinity of the optical axis and a convex portion 2622 in a vicinity of a periphery of the sixth lens element 260. Please refer to FIG. 8 for the optical characteristics of each lens elements in the optical imaging lens 2 the present embodiment, and please refer to FIG. 38 for the values of CT1, AC12, CT2, AC23, CT3, TA, AC34-TA, CT4, AC45, CT5, AC56, CT6, AAG, ALT, ALT/AAG, ALT/CT3, (CT3+ALT)/AAG, AC23/CT5, (CT3+AAG)/CT4, AC23/CT4, (CT2+CT3)/AAG, AC23/CT1, AAG/CT6, AAG/CT5, AC23/CT6, AC23/(AC45+CT1), (CT2+CT3)/AC34, (CT2+CT3)/(AC12+AC34), CT3/CT6 and AAG/CT4 of the present embodiment.

The optical imaging lens 2 which shows that the distance from the object-side surface 211 of the first lens element 210 to the image plane 270 along the optical axis is 18.955 mm and the length of the optical imaging lens 2 is shortened, compared with that of the conventional optical imaging lens and even with the optical imaging lens 1 of the first embodiment. Additionally, the HFOV of the optical imaging lens 2 is 56.4476, which is better than that of the conventional optical imaging lens, and this is capable to enlarge the shot angle.

As shown in FIG. 7, the optical imaging lens 2 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 2 is effectively shortened.

Figure 10:
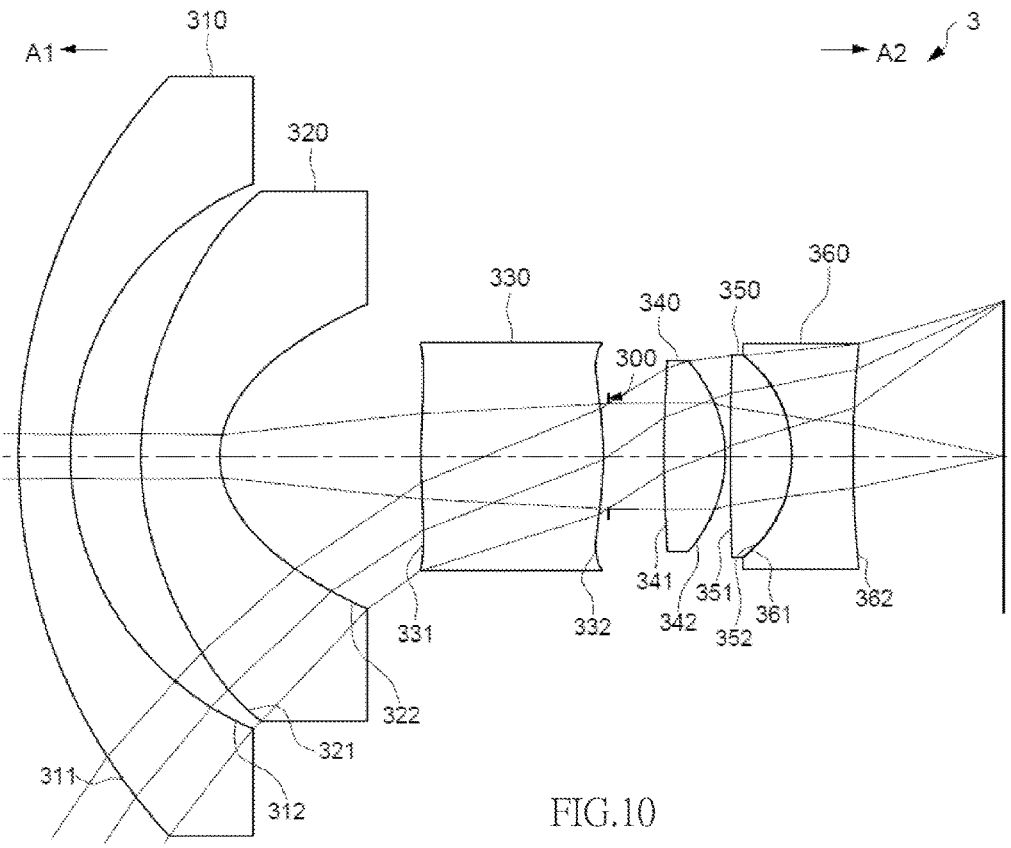
FIG. 10 is a cross-sectional view of a third embodiment of an optical imaging lens having six lens elements according to the present disclosure.
Figure 11:
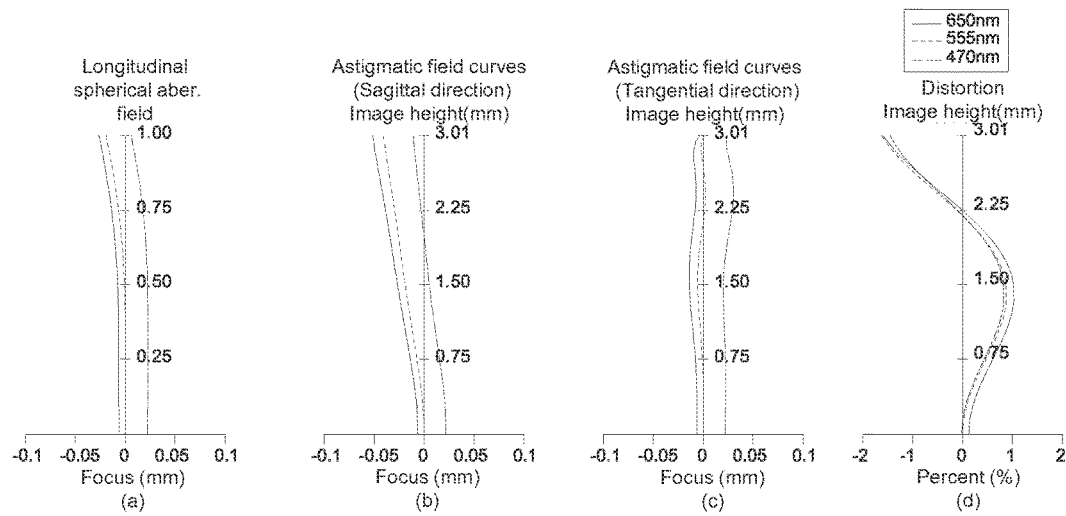
FIG. 11 is a chart of longitudinal spherical aberration and other kinds of optical aberrations of a third embodiment of the optical imaging lens according the present disclosure.

Reference is now made to FIGS. 10-13. FIG. 10 illustrates an example cross-sectional view of an optical imaging lens 3 having six lens elements of the optical imaging lens according to a third example embodiment. FIG. 11 shows example charts of longitudinal spherical aberration and other kinds of optical aberrations of the optical imaging lens 3 according to the third example embodiment. FIG. 12 shows an example table of optical data of each lens element of the optical imaging lens 3 according to the third example embodiment. FIG. 13 shows an example table of aspherical data of the optical imaging lens 3 according to the third example embodiment. The reference numbers labeled in the present embodiment are similar to those in the first embodiment for the similar elements, but here the reference numbers are initialed with 3, for example, reference number 331 for labeling the object-side surface of the third lens element 330, reference number 332 for labeling the image-side surface of the third lens element 330, etc.

As shown in FIG. 10, the optical imaging lens 3 of the present embodiment, in an order from an object side A1 to an image side A2 along an optical axis, comprises a first lens element 310, a second lens element 320, a third lens element 330, an aperture stop 300, a fourth lens element 340, a fifth lens element 350 and a sixth lens element 360.

The differences between the third embodiment and the first embodiment are the radius of curvature and thickness of each lens element and the distance of each air gap, but the configuration of the positive/negative refracting power of the first, second, third, fourth, fifth and sixth lens elements 310, 320, 330, 340, 350, 360 and configuration of the concave/convex shape of surfaces, comprising the object-side surfaces 311, 321, 331, 341, 351, 361 facing to the object side A1 and the image-side surfaces 312, 322, 332, 342, 352, 361 facing to the image side A2, are similar to those in the first embodiment. Here, for clearly showing the drawings of the present embodiment, only the surface shapes which are different from that in the first embodiment are labeled. Please refer to FIG. 12 for the optical characteristics of each lens elements in the optical imaging lens 3 of the present embodiment, and please refer to FIG. 38 for the values of CT1, AC12, CT2, AC23, CT3, TA, AC34-TA, CT4, AC45, CT5, AC56, CT6, AAG, ALT, ALT/AAG, ALT/CT3, (CT3+ALT)/AAG, AC23/CT5, (CT3+AAG)/CT4, AC23/CT4, (CT2+CT3)/AAG, AC23/CT1, AAG/CT6, AAG/CT5, AC23/CT6, AC23/(AC45+CT1), (CT2+CT3)/AC34, (CT2+CT3)/(AC12+AC34), CT3/CT6 and AAG/CT4 of the present embodiment.

The optical imaging lens 3 which shows that the distance from the object-side surface 311 of the first lens element 310 to the image plane 370 along the optical axis is 19.007 mm and the length of the optical imaging lens 3 is shortened, compared with that of the conventional optical imaging lens and even with the optical imaging lens 1 of the first embodiment. Additionally, the HFOV of the optical imaging lens 3 is 58.7408, which is better than that of the conventional optical imaging lens, and this is capable to enlarge the shot angle.

As shown in FIG. 11, the optical imaging lens 3 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 3 is effectively shortened.

Figure 14:
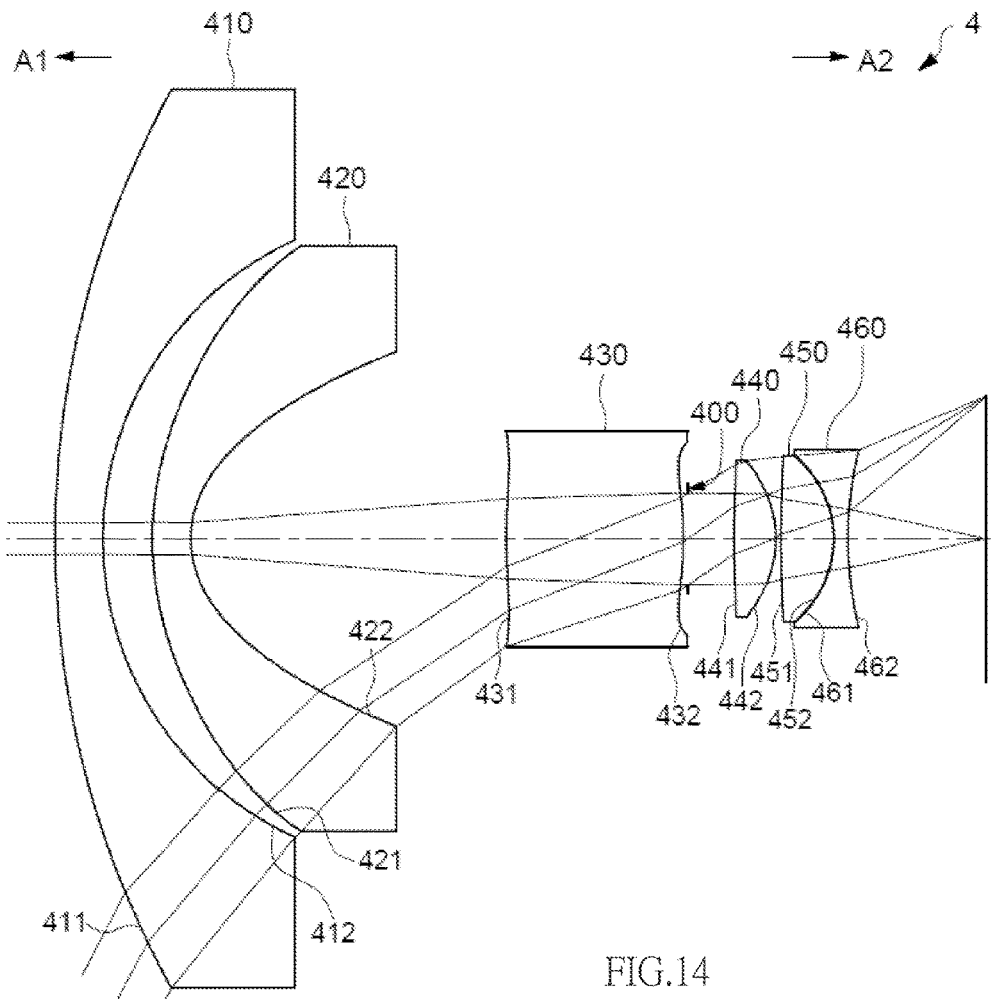
FIG. 14 is a cross-sectional view of a fourth embodiment of an optical imaging lens having six lens elements according to the present disclosure.
Figure 15:
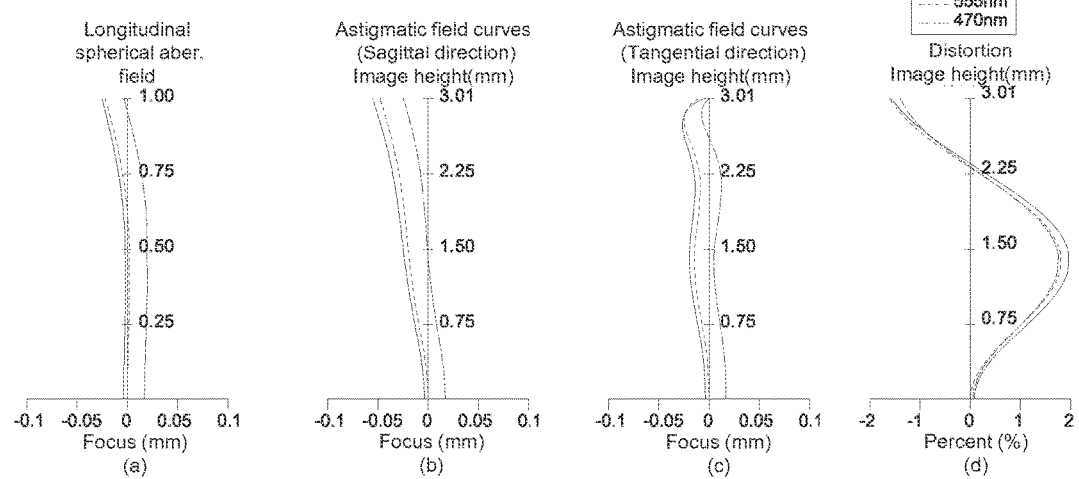
FIG. 15 is a chart of longitudinal spherical aberration and other kinds of optical aberrations of a fourth embodiment of the optical imaging lens according the present disclosure.

Reference is now made to FIGS. 14-17. FIG. 14 illustrates an example cross-sectional view of an optical imaging lens 4 having six lens elements of the optical imaging lens according to a fourth example embodiment. FIG. 15 shows example charts of longitudinal spherical aberration and other kinds of optical aberrations of the optical imaging lens 4 according to the fourth embodiment. FIG. 16 shows an example table of optical data of each lens element of the optical imaging lens 4 according to the fourth example embodiment. FIG. 17 shows an example table of aspherical data of the optical imaging lens 4 according to the fourth example embodiment. The reference numbers labeled in the present embodiment are similar to those in the first embodiment for the similar elements, but here the reference numbers are initialed with 4, for example, reference number 431 for labeling the object-side surface of the third lens element 430, reference number 432 for labeling the image-side surface of the third lens element 430, etc.

As shown in FIG. 14, the optical imaging lens 4 of the present embodiment, in an order from an object side A1 to an image side A2 along an optical axis, comprises a first lens element 410, a second lens element 420, a third lens element 430, an aperture stop 400, a fourth lens element 440, a fifth lens element 450 and a sixth lens element 460.

The differences between the fourth embodiment and the first embodiment are the radius of curvature and thickness of each lens element and the distance of each air gap, but the configuration of the positive/negative refracting power of the first, second, third, fourth fifth and sixth lens elements 410, 420, 430, 440, 450, 460 and configuration of the concave/convex shape of surfaces, comprising the object-side surfaces 411, 421, 431, 441, 451, 461 facing to the object side A1 and the image-side surfaces 412, 422, 432, 442, 452, 461 facing to the image side A2, are similar to those in the first embodiment. Here, for clearly showing the drawings of the present embodiment, only the surface shapes which are different from that in the first embodiment are labeled. Please refer to FIG. 16 for the optical characteristics of each lens elements in the optical imaging lens 4 of the present embodiment, and please refer to FIG. 38 for the values of CT1, AC12, CT2, AC23, CT3, TA, AC34-TA, CT4, AC45, CT5, AC56, CT6, AAG, ALT, ALT/AAG, ALT/CT3, (CT3+ALT)/AAG, AC23/CT5, (CT3+AAG)/CT4, AC23/CT4, (CT2+CT3)/AAG, AC23/CT1, AAG/CT6, AAG/CT5, AC23/CT6, AC23/(AC45+CT1), (CT2+CT3)/AC34, (CT2+CT3)/(AC12+AC34), CT3/CT6 and AAG/CT4 of the present embodiment.

The optical imaging lens 4 which shows that the distance from the object-side surface 411 of the first lens element 410 to the image plane 470 along the optical axis is 19.508 mm and the length of the optical imaging lens 4 is shortened, compared with that of the conventional optical imaging lens and even with that of the optical imaging lens 1 of the first embodiment. Additionally, the HFOV of the optical imaging lens 4 is 62.3229, which is better than that of the optical imaging lens 1 of the first embodiment, and this is capable to enlarge the shot angle.

As shown in FIG. 15, the optical imaging lens 4 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 4 is effectively shortened.

Figure 18:
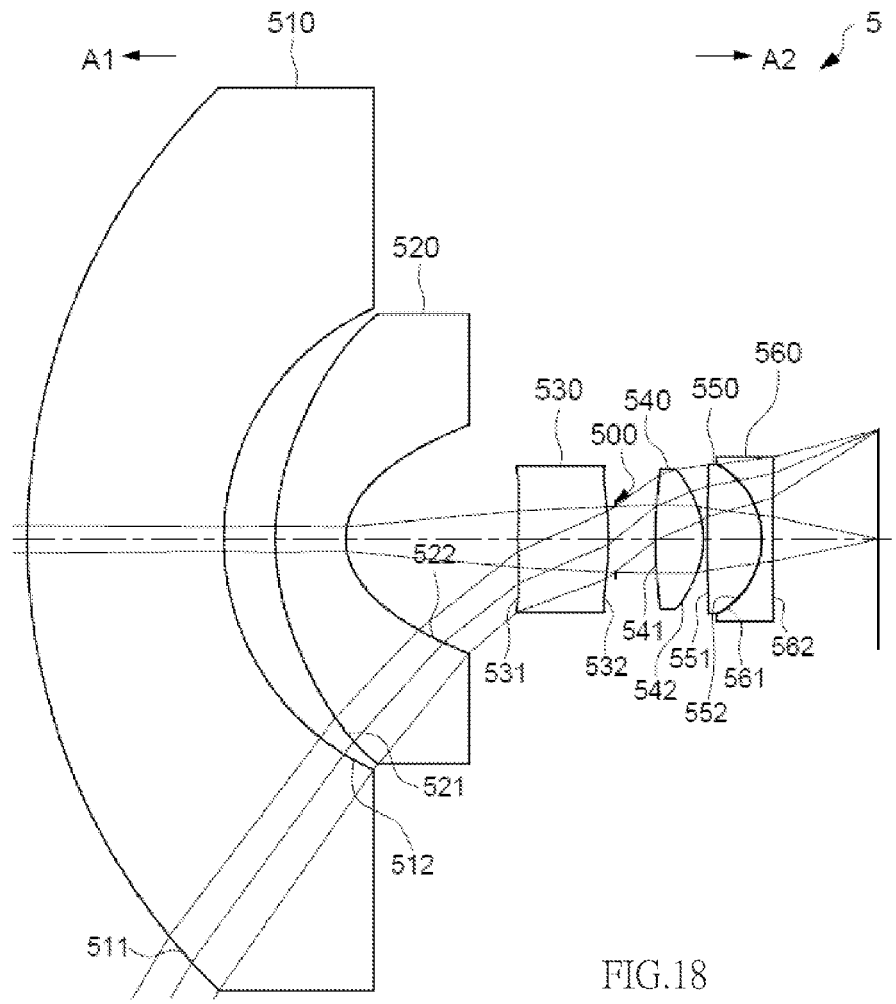
FIG. 18 is a cross-sectional view of a fifth embodiment of an optical imaging lens having six lens elements according to the present disclosure.
Figure 19:
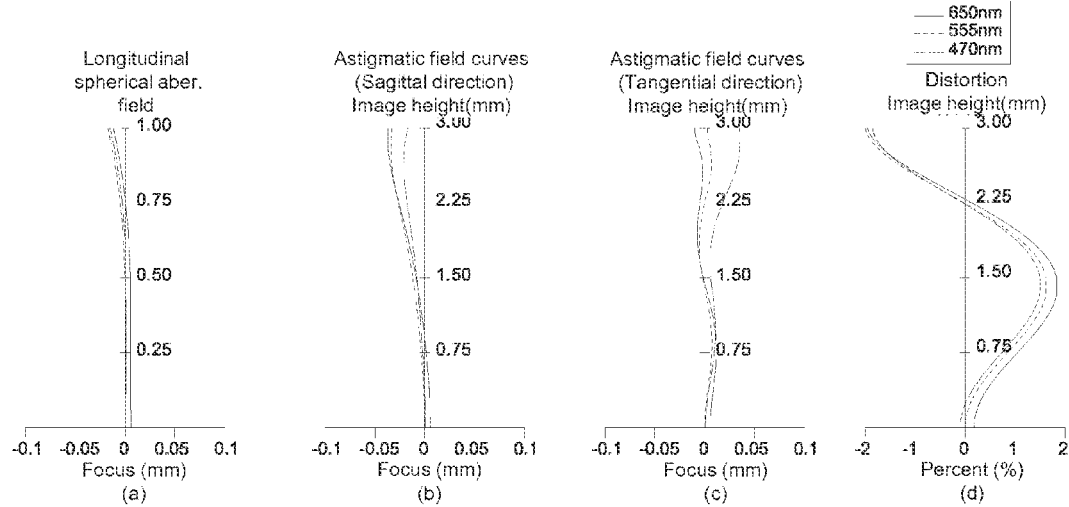
FIG. 19 is a chart of longitudinal spherical aberration and other kinds of optical aberrations of a fifth embodiment of the optical imaging lens according the present disclosure.

Reference is now made to FIGS. 18-21. FIG. 18 illustrates an example cross-sectional view of an optical imaging lens 5 having six lens elements of the optical imaging lens according to a fifth example embodiment. FIG. 19 shows example charts of longitudinal spherical aberration and other kinds of optical aberrations of the optical imaging lens 5 according to the fifth embodiment. FIG. 20 shows an example table of optical data of each lens element of the optical imaging lens 5 according to the fifth example embodiment. FIG. 21 shows an example table of aspherical data of the optical imaging lens 5 according to the fifth example embodiment. The reference numbers labeled in the present embodiment are similar to those in the first embodiment for the similar elements, but here the reference numbers are initialed with 5, for example, reference number 531 for labeling the object-side surface of the third lens element 530, reference number 532 for labeling the image-side surface of the third lens element 530, etc.

As shown in FIG. 18, the optical imaging lens 5 of the present embodiment, in an order from an object side A1 to an image side A2 along an optical axis, comprises a first lens element 510, a second lens element 520, a third lens element 530, an aperture stop 500, a fourth lens element 540, a fifth lens element 550 and a sixth lens element 560.

The differences between the fifth embodiment and the first embodiment are the radius of curvature and thickness of each lens element and the distance of each air gap, but the configuration of the positive/negative refracting power of the first, second, third, fourth, fifth and sixth lens elements 510, 520, 530, 540, 550, 560 and configuration of the concave/convex shape of surfaces, comprising the object-side surfaces 511, 521, 531, 541, 551, 561 facing to the object side A1 and the image-side surfaces 512, 522, 532, 542, 552, 562 facing to the image side A2, are similar to those in the first embodiment. Here, for clearly showing the drawings of the present embodiment, only the surface shapes which are different from that in the first embodiment are labeled. Please refer to FIG. 20 for the optical characteristics of each lens elements in the optical imaging lens 5 of the present embodiment, and please refer to FIG. 38 for the values of CT1, AC12, CT2, AC23, CT3, TA, AC34-TA, CT4, AC45, CT5, AC56, CT6, AAG, ALT, ALT/AAG, ALT/CT3, (CT3+ALT)/AAG, AC23/CT5, (CT3+AAG)/CT4, AC23/CT4, (CT2+CT3)/AAG, AC23/CT1, AAG/CT6, AAG/CT5, AC23/CT6, AC23/(AC45+CT1), (CT2+CT3)/AC34, (CT2+CT3)/(AC12+AC34), CT3/CT6 and AAG/CT4 of the present embodiment.

The optical imaging lens 5 which shows that the distance from the object-side surface 511 of the first lens element 510 to the image plane 570 along the optical axis is 23.305 mm and the length of the optical imaging lens 5 is shortened, compared with that of the conventional optical imaging lens and even with that of the optical imaging lens 1 of the first embodiment. Additionally, the HFOV of the optical imaging lens 5 is 59.5476, which is better than that of the optical imaging lens 1 of the first embodiment, and this is capable to enlarge the shot angle.

As shown in FIG. 19, the optical imaging lens 5 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 5 is effectively shortened.

Figure 22:
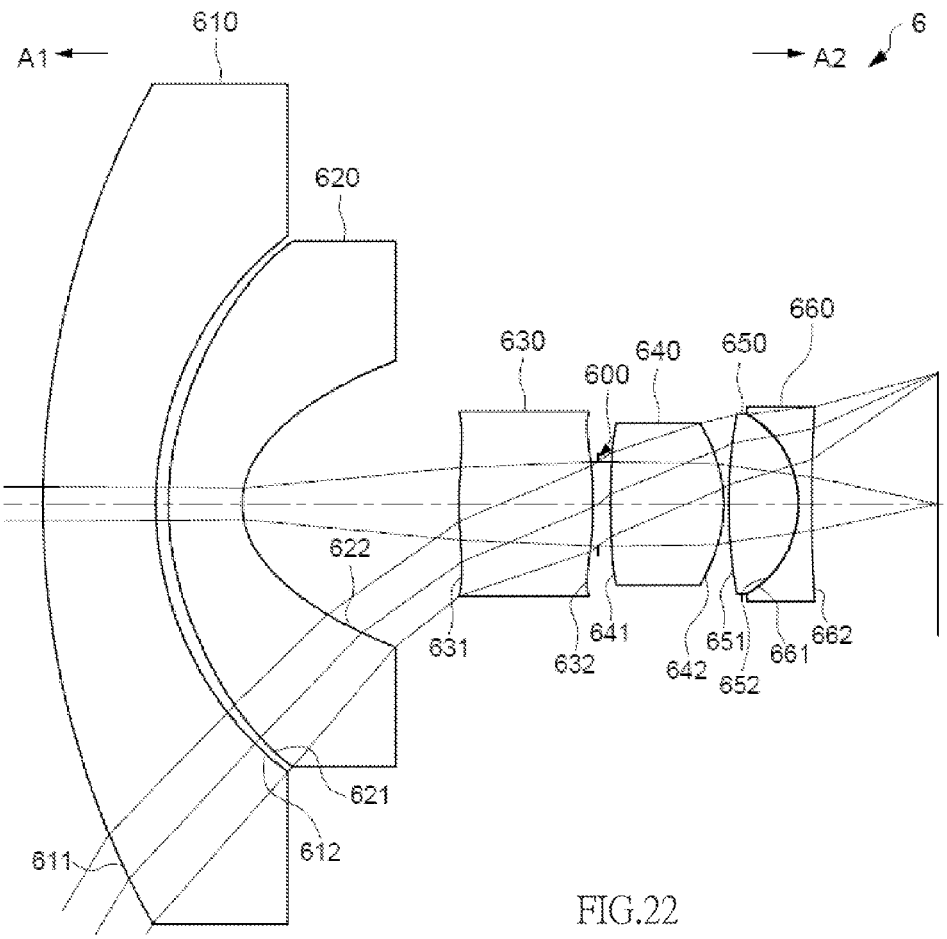
FIG. 22 is a cross-sectional view of a sixth embodiment of an optical imaging lens having six lens elements according to the present disclosure.
Figure 23:
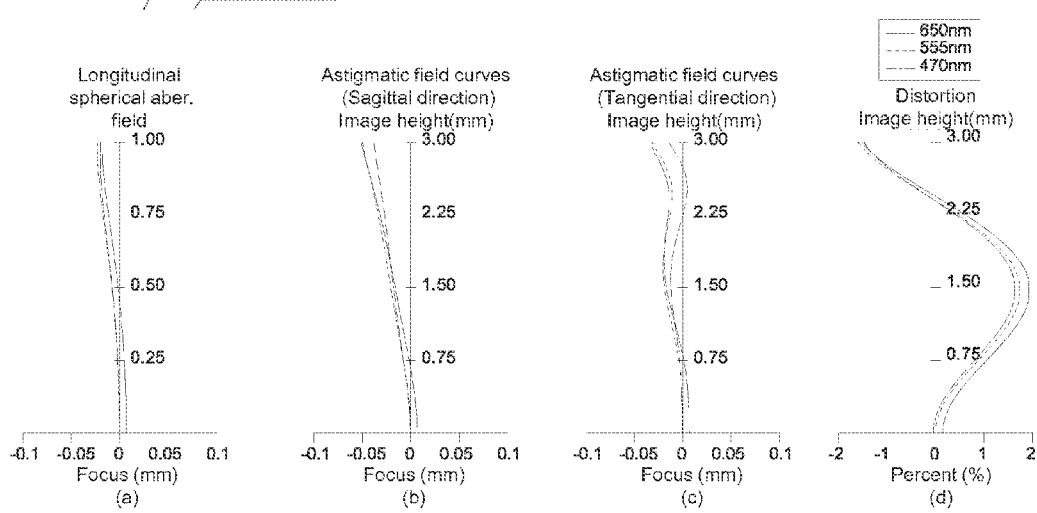
FIG. 23 is a chart of longitudinal spherical aberration and other kinds of optical aberrations of a sixth embodiment of the optical imaging lens according the present disclosure.

Reference is now made to FIGS. 22-25. FIG. 22 illustrates an example cross-sectional view of an optical imaging lens 6 having six lens elements of the optical imaging lens according to a sixth example embodiment. FIG. 23 shows example charts of longitudinal spherical aberration and other kinds of optical aberrations of the optical imaging lens 6 according to the sixth embodiment. FIG. 24 shows an example table of optical data of each lens element of the optical imaging lens 6 according to the sixth example embodiment. FIG. 25 shows an example table of aspherical data of the optical imaging lens 6 according to the sixth example embodiment. The reference numbers labeled in the present embodiment are similar to those in the first embodiment for the similar elements, but here the reference numbers are initialed with 6, for example, reference number 631 for labeling the object-side surface of the third lens element 630, reference number 632 for labeling the image-side surface of the third lens element 630, etc.

As shown in FIG. 22, the optical imaging lens 6 of the present embodiment, in an order from an object side A1 to an image side A2 along an optical axis, comprises a first lens element 610, a second lens element 620, a third lens element 630, an aperture stop 600, a fourth lens element 640, a fifth lens element 650 and a sixth lens element 660.

The differences between the sixth embodiment and the first embodiment are the radius of curvature and thickness of each lens element and the distance of each air gap, but the configuration of the positive/negative refracting power of the first, second, third, fourth, fifth and sixth lens elements 610, 620, 630, 640, 650, 660 and configuration of the concave/convex shape of surfaces, comprising the object-side surfaces 611, 621, 631, 641, 651, 661 facing to the object side A1 and the image-side surfaces 612, 622, 632, 642, 652, 662 facing to the image side A2, are similar to those in the first embodiment. Here, for clearly showing the drawings of the present embodiment, only the surface shapes which are different from that in the first embodiment are labeled. Please refer to FIG. 24 for the optical characteristics of each lens elements in the optical imaging lens 6 of the present embodiment, and please refer to FIG. 38 for the values of CT1, AC12, CT2, AC23, CT3, TA, AC34-TA, CT4, AC45, CT5, AC56, CT6, AAG, ALT, ALT/AAG, ALT/CT3, (CT3+ALT)/AAG, AC23/CT5, (CT3+AAG)/CT4, AC23/CT4, (CT2+CT3)/AAG, AC23/CT1, AAG/CT6, AAG/CT5, AC23/CT6, AC23/(AC45+CT1), (CT2+CT3)/AC34, (CT2+CT3)/(AC12+AC34), CT3/CT6 and AAG/CT4 of the present embodiment.

The optical imaging lens 6 which shows that the distance from the object-side surface 611 of the first lens element 610 to the image plane 670 along the optical axis is 20.517 mm and the length of the optical imaging lens 6 is shortened, compared with that of the conventional optical imaging lens and even with that of the optical imaging lens 1 of the first embodiment. Additionally, the HFOV of the optical imaging lens 6 is 58.3841, which is better than that of the conventional optical imaging lens, and this is capable to enlarge the shot angle.

As shown in FIG. 23, the optical imaging lens 6 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 6 is effectively shortened.

Figure 26:
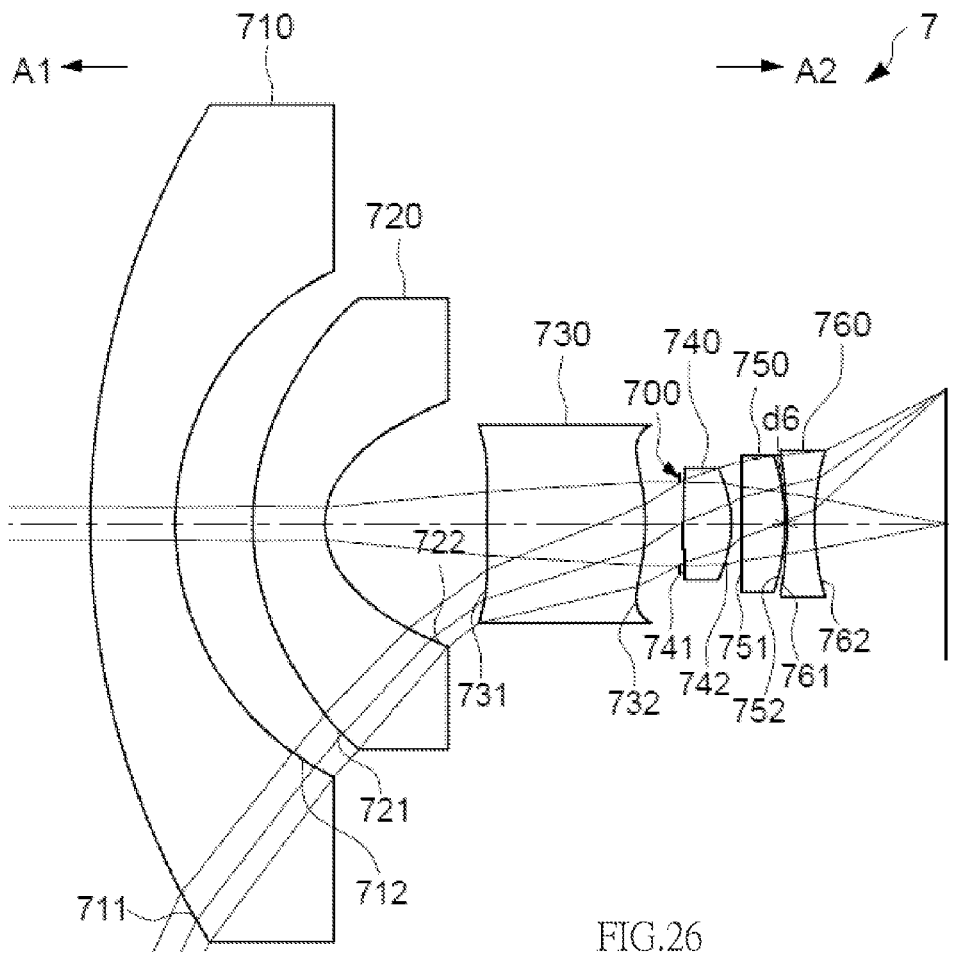
FIG. 26 is a cross-sectional view of a seventh embodiment of an optical imaging lens having six lens elements according to the present disclosure.
Figure 27:
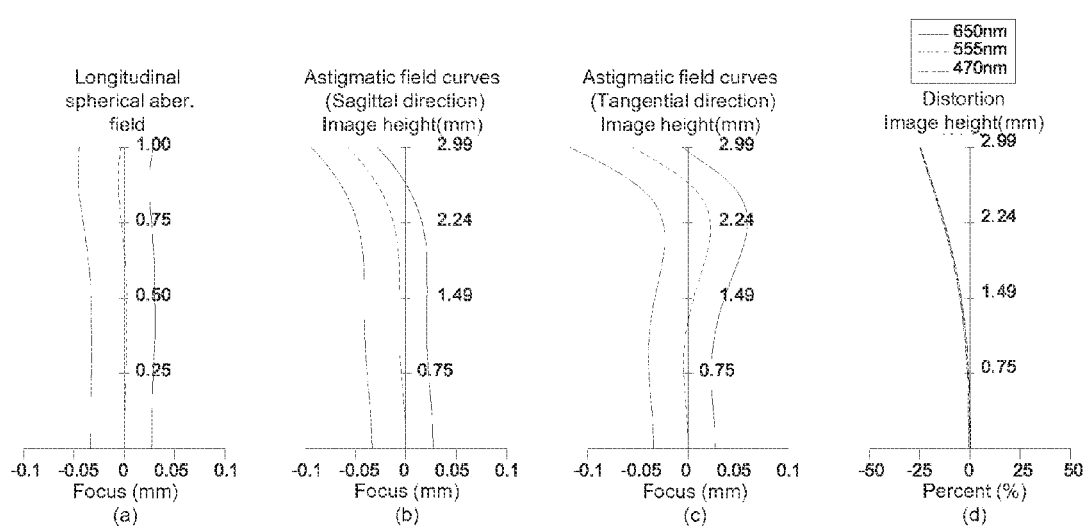
FIG. 27 is a chart of longitudinal spherical aberration and other kinds of optical aberrations of a seventh embodiment of the optical imaging lens according the present disclosure.

Reference is now made to FIGS. 26-29. FIG. 26 illustrates an example cross-sectional view of an optical imaging lens 7 having six lens elements of the optical imaging lens according to a seventh example embodiment. FIG. 27 shows example charts of longitudinal spherical aberration and other kinds of optical aberrations of the optical imaging lens 7 according to the seventh embodiment. FIG. 28 shows an example table of optical data of each lens element of the optical imaging lens 7 according to the seventh example embodiment. FIG. 29 shows an example table of aspherical data of the optical imaging lens 7 according to the seventh example embodiment. The reference numbers labeled in the present embodiment are similar to those in the first embodiment for the similar elements, but here the reference numbers are initialed with 7, for example, reference number 731 for labeling the object-side surface of the third lens element 730, reference number 732 for labeling the image-side surface of the third lens element 730, etc.

As shown in FIG. 26, the optical imaging lens 7 of the present embodiment, in an order from an object side A1 to an image side A2 along an optical axis, comprises a first lens element 710, a second lens element 720, a third lens element 730, an aperture stop 700, a fourth lens element 740, a fifth lens element 750 and a sixth lens element 760.

The differences between the seventh embodiment and the first embodiment are the radius of curvature and thickness of each lens element and the distance of each air gap, but the configuration of the positive/negative refracting power of the first, second, third, fourth, fifth and sixth lens elements 710, 720, 730, 740, 750, 760 and configuration of the concave/convex shape of surfaces, comprising the object-side surfaces 711, 721, 731, 741, 751, 761 facing to the object side A1 and the image-side surfaces 712, 722, 732, 742, 752, 762 facing to the image side A2, are similar to those in the first embodiment. Please note that an air gap d6 is formed between the fifth and sixth lens elements 750, 760, and AAG is the sum of d1, d2, d3, d4 (all of these four air gaps are shown in FIG. 2) and d6. Here, for clearly showing the drawings of the present embodiment, only the surface shapes which are different from that in the first embodiment are labeled. Please refer to FIG. 28 for the optical characteristics of each lens elements in the optical imaging lens 7 of the present embodiment, and please refer to FIG. 38 for the values of CT1, AC12, CT2, AC23, CT3, TA, AC34-TA, CT4, AC45, CT5, AC56, CT6, AAG, ALT, ALT/AAG, ALT/CT3, (CT3+ALT)/AAG, AC23/CT5, (CT3+AAG)/CT4, AC23/CT4, (CT2+CT3)/AAG, AC23/CT1, AAG/CT6, AAG/CT5, AC23/CT6, AC23/(AC45+CT1), (CT2+CT3)/AC34, (CT2+CT3)/(AC12+AC34), CT3/CT6 and AAG/CT4 of the present embodiment.

The optical imaging lens 7 which shows that the distance from the object-side surface 711 of the first lens element 710 to the image plane 770 along the optical axis is 19.084 mm and the length of the optical imaging lens 7 is shortened, compared with that of the conventional optical imaging lens and even with that of the optical imaging lens 1 of the first embodiment. Additionally, the HFOV of the optical imaging lens 7 is 64.5344, which is better than that of the optical imaging lens 1 of the first embodiment, and this is capable to enlarge the shot angle.

As shown in FIG. 27, the optical imaging lens 7 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 7 is effectively shortened.

Figure 30:
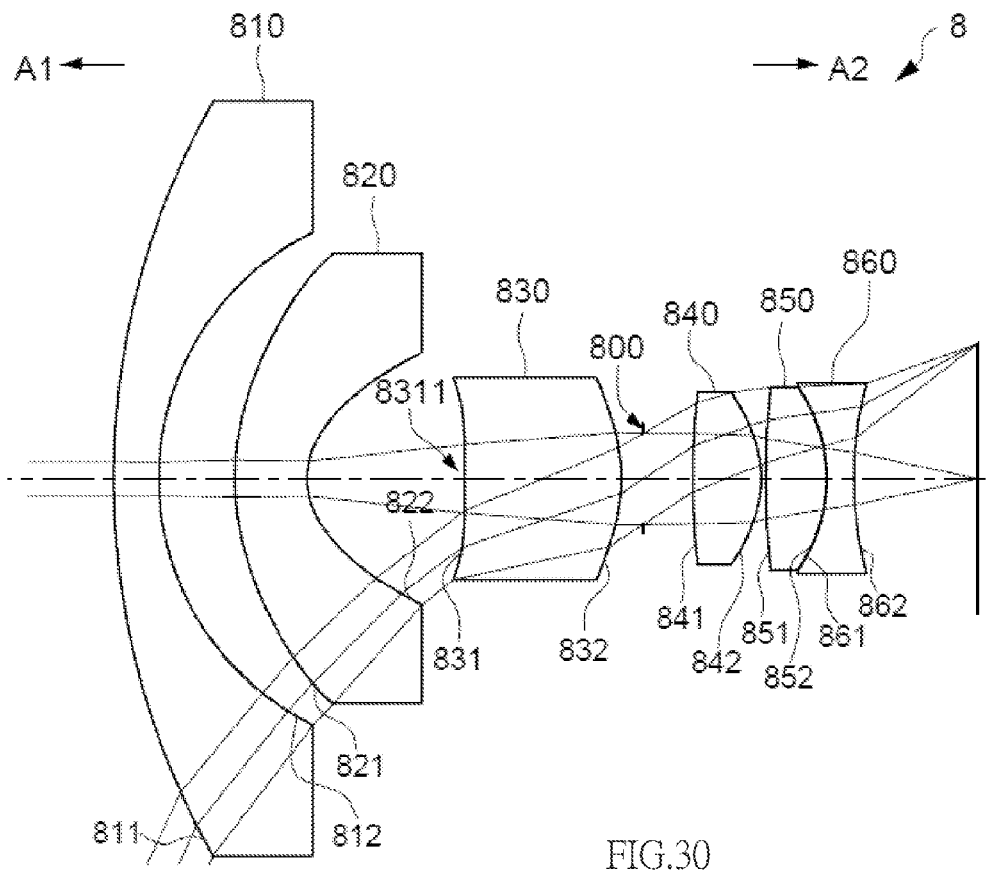
FIG. 30 is a cross-sectional view of an eighth embodiment of an optical imaging lens having six lens elements according to the present disclosure.
Figure 31:
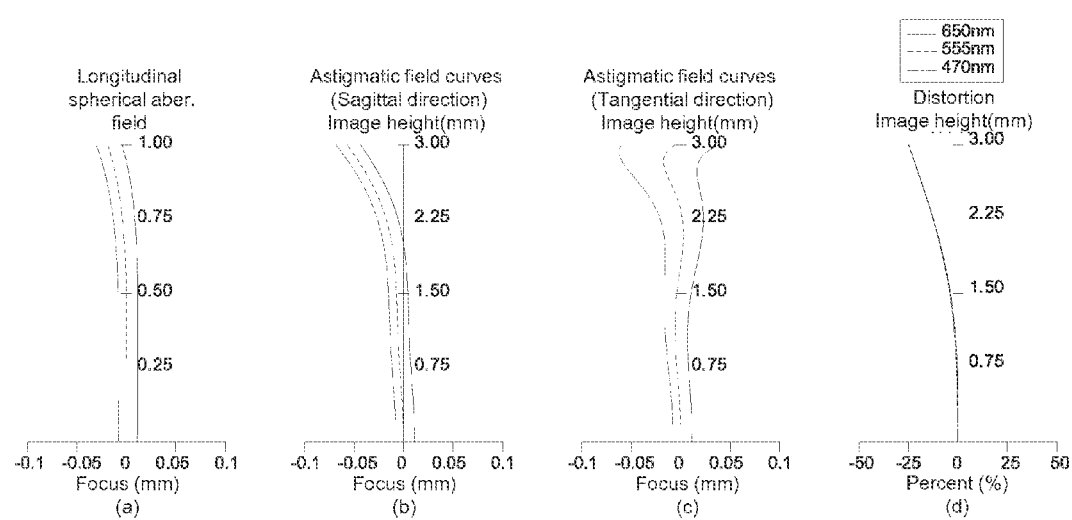
FIG. 31 is a chart of longitudinal spherical aberration and other kinds of optical aberrations of an eighth embodiment of the optical imaging lens according the present disclosure.

Reference is now made to FIGS. 30-33. FIG. 30 illustrates an example cross-sectional view of an optical imaging lens 8 having six lens elements of the optical imaging lens according to an eighth example embodiment. FIG. 31 shows example charts of longitudinal spherical aberration and other kinds of optical aberrations of the optical imaging lens 8 according to the eighth embodiment. FIG. 32 shows an example table of optical data of each lens element of the optical imaging lens 8 according to the eighth example embodiment. FIG. 33 shows an example table of aspherical data of the optical imaging lens 8 according to the eighth example embodiment. The reference numbers labeled in the present embodiment are similar to those in the first embodiment for the similar elements, but here the reference numbers are initialed with 8, for example, reference number 831 for labeling the object-side surface of the third lens element 830, reference number 832 for labeling the image-side surface of the third lens element 830, etc.

As shown in FIG. 30, the optical imaging lens 8 of the present embodiment, in an order from an object side A1 to an image side A2 along an optical axis, comprises a first lens element 810, a second lens element 820, a third lens element 830, an aperture stop 800, a fourth lens element 840, a fifth lens element 850 and a sixth lens element 860.

The differences between the eighth embodiment and the first embodiment are the radius of curvature and thickness of each lens element, the distance of each air gap and the configuration of the concave/convex shape of the object-side surfaces 831, but the configuration of the positive/negative refracting power of the first, second, third, fourth, fifth and sixth lens elements 810, 820, 830, 840, 850, 860 and configuration of the concave/convex shape of surfaces, comprising the object-side surfaces 811, 821, 841, 851, 861 facing to the object side A1 and the image-side surfaces 812, 822, 832, 842, 852, 862 facing to the image side A2, are similar to those in the first embodiment. Specifically, the object-side surface 831 of the third lens element 830 is a concave surface comprises a concave portion 8311 in a vicinity of the optical axis. Here, for clearly showing the drawings of the present embodiment, only the surface shapes which are different from that in the first embodiment are labeled. Please refer to FIG. 32 for the optical characteristics of each lens elements in the optical imaging lens 8 of the present embodiment, and please refer to FIG. 38 for the values of CT1, AC12, CT2, AC23, CT3, TA, AC34-TA, CT4, AC45, CT5, AC56, CT6, AAG, ALT, ALT/AAG, ALT/CT3, (CT3+ALT)/AAG, AC23/CT5, (CT3+AAG)/CT4, AC23/CT4, (CT2+CT3)/AAG, AC23/CT1, AAG/CT6, AAG/CT5, AC23/CT6, AC23/(AC45+CT1), (CT2+CT3)/AC34, (CT2+CT3)/(AC12+AC34), CT3/CT6 and AAG/CT4 of the present embodiment.

The optical imaging lens 8 which shows that the distance from the object-side surface 811 of the first lens element 810 to the image plane 870 along the optical axis is 19.135 mm and the length of the optical imaging lens 8 is shortened, compared with that of the conventional optical imaging lens and even with that of the optical imaging lens 1 of the first embodiment. Additionally, the HFOV of the optical imaging lens 8 is 65.2053, which is better than that of the optical imaging lens 1 of the first embodiment, and this is capable to enlarge the shot angle.

As shown in FIG. 31, the optical imaging lens 8 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 8 is effectively shortened.

Figure 34:
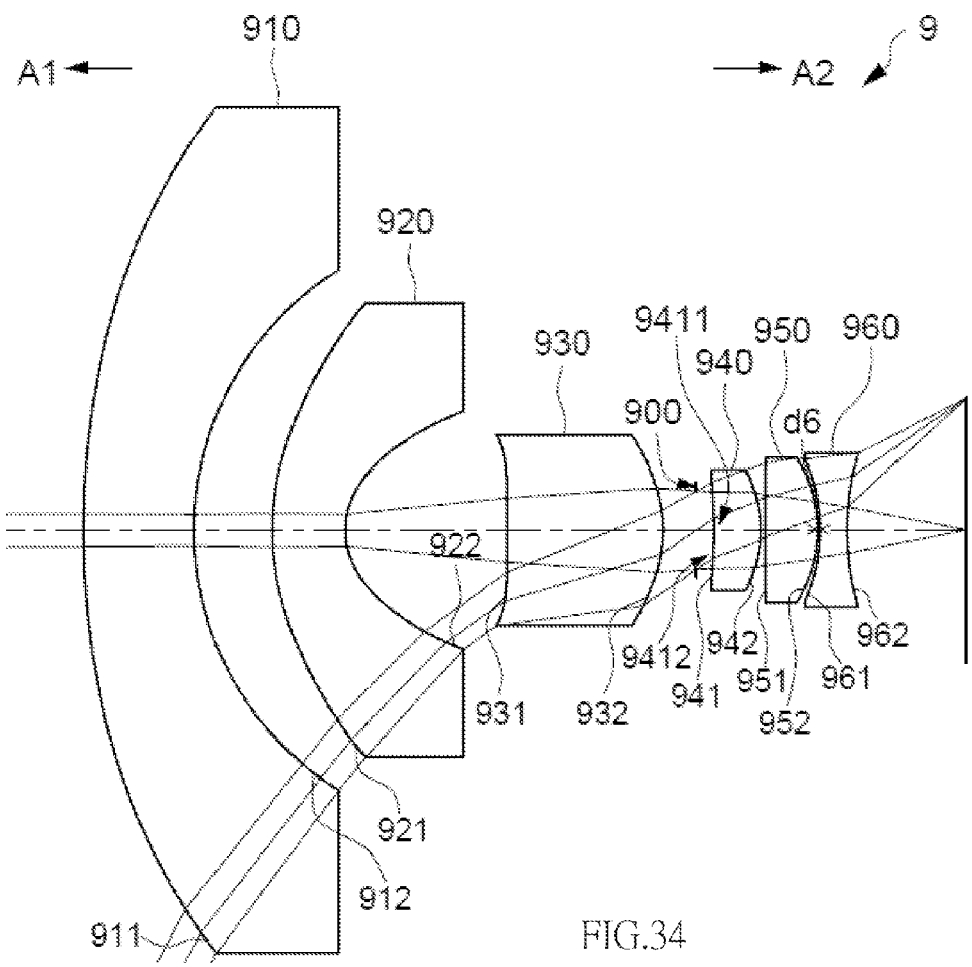
FIG. 34 is a cross-sectional view of an ninth embodiment of an optical imaging lens having six lens elements according to the present disclosure.
Figure 35:
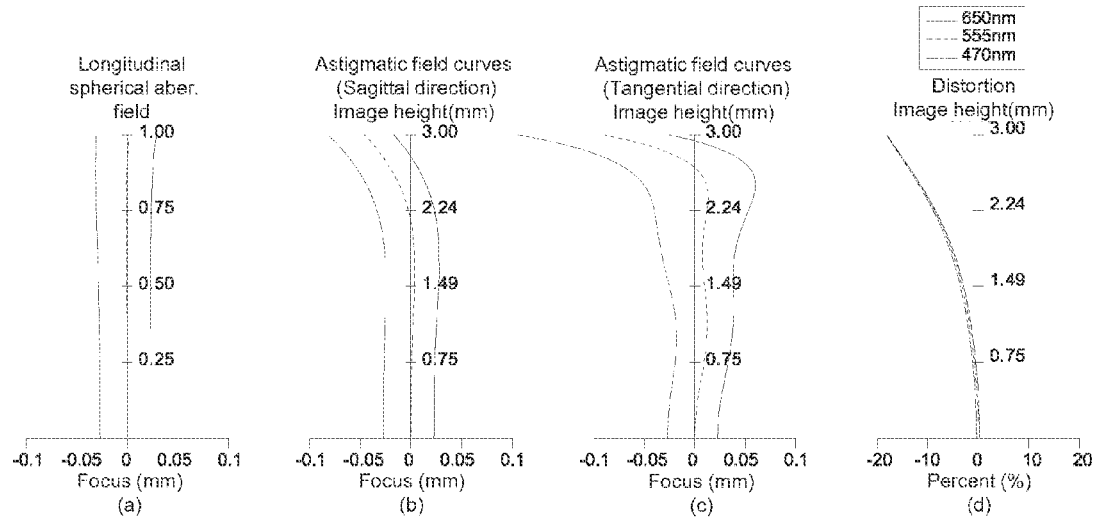
FIG. 35 is a chart of longitudinal spherical aberration and other kinds of optical aberrations of an ninth embodiment of the optical imaging lens according the present disclosure.
Figure 39:
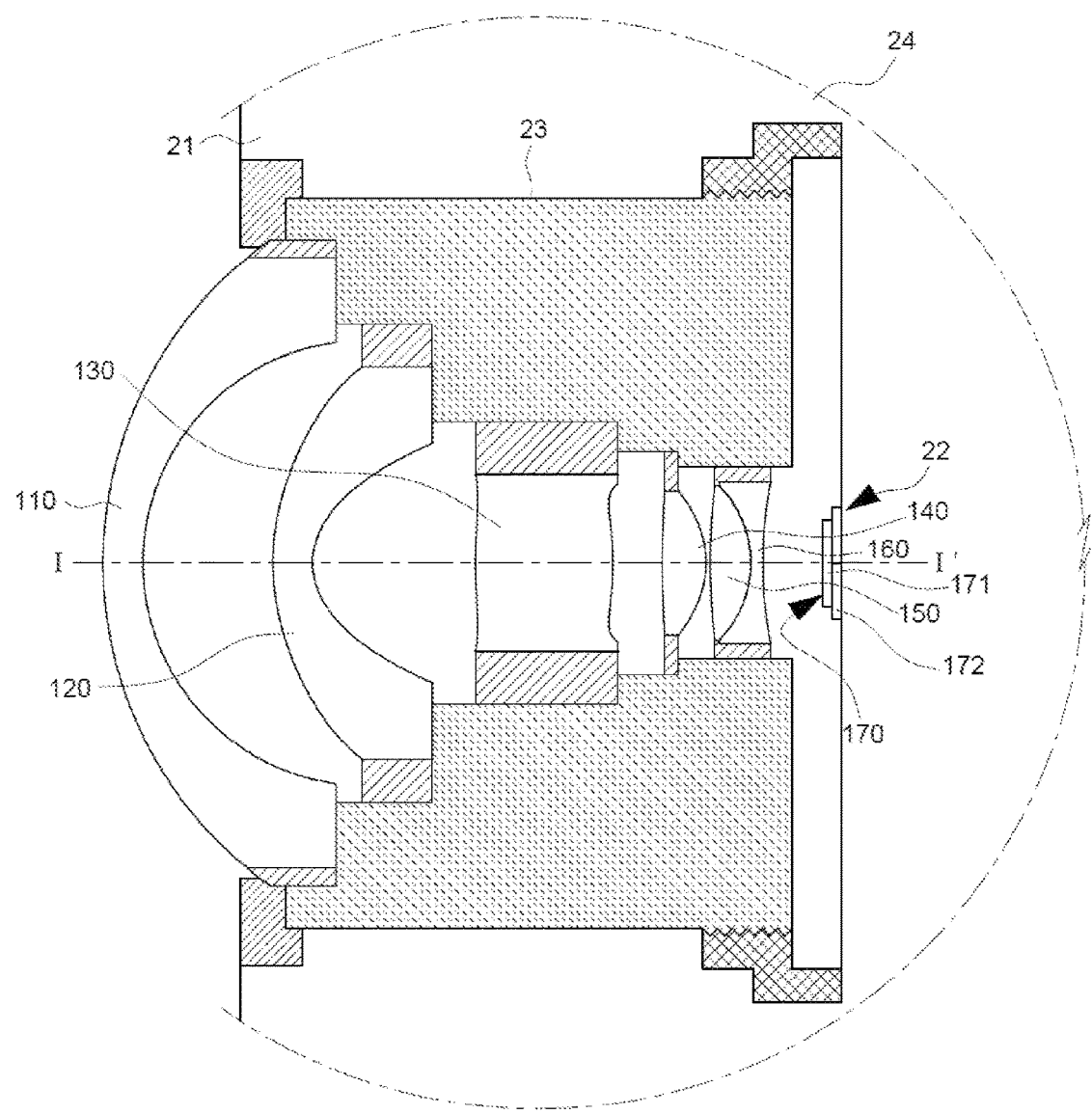
FIG. 39 is a structure of an example embodiment of a camera device.

Reference is now made to FIGS. 34-37. FIG. 34 illustrates an example cross-sectional view of an optical imaging lens 9 having six lens elements of the optical imaging lens according to an ninth example embodiment. FIG. 35 shows example charts of longitudinal spherical aberration and other kinds of optical aberrations of the optical imaging lens 9 according to the ninth embodiment. FIG. 36 shows an example table of optical data of each lens element of the optical imaging lens 9 according to the ninth example embodiment. FIG. 37 shows an example table of aspherical data of the optical imaging lens 9 according to the ninth example embodiment. The reference numbers labeled in the present embodiment are similar to those in the first embodiment for the similar elements, but here the reference numbers are initialed with 9, for example, reference number 931 for labeling the object-side surface of the third lens element 930, reference number 932 for labeling the image-side surface of the third lens element 930, etc.

As shown in FIG. 34, the optical imaging lens 9 of the present embodiment, in an order from an object side A1 to an image side A2 along an optical axis, comprises a first lens element 910, a second lens element 920, a third lens element 930, an aperture stop 900, a fourth lens element 940, a fifth lens element 950 and a sixth lens element 960.

The differences between the ninth embodiment and the first embodiment are the radius of curvature and thickness of each lens element, the distance of each air gap and the configuration of the concave/convex shape of the object-side surfaces 941, but the configuration of the positive/negative refracting power of the first, second, third, fourth, fifth and sixth lens elements 910, 920, 930, 940, 950, 960 and configuration of the concave/convex shape of surfaces, comprising the object-side surfaces 911, 921, 931, 951, 961 facing to the object side A1 and the image-side surfaces 912, 922, 932, 942, 952, 962 facing to the image side A2, are similar to those in the first embodiment. Specifically, the object-side surface 941 of the fourth lens element 940 is a concave surface comprises a concave portion 9411 in a vicinity of the optical axis and a concave portion 9412 in a vicinity of a periphery of the fourth lens element 940. Here, for clearly showing the drawings of the present embodiment, only the surface shapes which are different from that in the first embodiment are labeled. Please refer to FIG. 36 for the optical characteristics of each lens elements in the optical imaging lens 9 of the present embodiment, and please refer to FIG. 38 for the values of CT1, AC12, CT2, AC23, CT3, TA, AC34-TA, CT4, AC45, CT5, AC56, CT6, AAG, ALT, ALT/AAG, ALT/CT3, (CT3+ALT)/AAG, AC23/CT5, (CT3+AAG)/CT4, AC23/CT4, (CT2+CT3)/AAG, AC23/CT1, AAG/CT6, AAG/CT5, AC23/CT6, AC23/(AC45+CT1), (CT2+CT3)/AC34, (CT2+CT3)/(AC12+AC34), CT3/CT6 and AAG/CT4 of the present embodiment.

The optical imaging lens 9 which shows that the distance from the object-side surface 911 of the first lens element 910 to the image plane 970 along the optical axis is 19.959 mm and the length of the optical imaging lens 9 is shortened, compared with that of the conventional optical imaging lens. Additionally, the f-number of the optical imaging lens 9 is 2.6, which is greater than that of the optical imaging lens 1 of the first embodiment, and this is beneficial to promote the imaging quality; the HFOV of the optical imaging lens 9 is 62.1817, which is better than that of the optical imaging lens 1 of the first embodiment, and this is capable to enlarge the shot angle.

As shown in FIG. 35, the optical imaging lens 9 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 9 is effectively shortened.

Please refer to FIG. 38, which shows the values of CT1, AC12, CT2, AC23, CT3, TA, AC34-TA, CT4, AC45, CT5, AC56, CT6, AAG, ALT, ALT/AAG, ALT/CT3, (CT3+ALT)/AAG, AC23/CT5, (CT3+AAG)/CT4, AC23/CT4, (CT2+CT3)/AAG, AC23/CT1, AAG/CT6, AAG/CT5, AC23/CT6, AC23/(AC45+CT1), (CT2+CT3)/AC34, (CT2+CT3)/(AC12+AC34), CT3/CT6 and AAG/CT4 of all nine embodiments, and it is clear that the optical imaging lens of the present invention satisfy the Equations (1), (2), (3), (4), (5), (6), (7), (8), (9), (10), (11), (12), (13), (14), (15) and/or (16).

Reference is now made to FIG. 35, which illustrates an example structural view of a first embodiment of camera device 20 applying an aforesaid optical imaging lens. The camera device 20 comprises a housing 21 and a photography module 22 positioned in the housing 21. Examples of the camera device 20 may be, but are not limited to, mobile phones, tablet computers, personal digital assistants (PDA), gaming machines, such as video game consoles, handhold game console, etc., environmental monitors, event data recorders, reversing camera systems mounted on motor vehicles, wide-angle camera, etc.

As shown in FIG. 35, the photography module 22 may comprise an aforesaid optical imaging lens with six lens elements, which is a prime lens and for example the optical imaging lens 1 of the first embodiment, a lens barrel 23 for positioning the optical imaging lens 1, a module housing unit 24 for positioning the lens barrel 23, a substrate 172 for positioning the module housing unit 24, and an image sensor 171 which is positioned at an image side of the optical imaging lens 1. The image plane 170 is formed on the image sensor 171.

In some other example embodiments, an additional filtering unit may be positioned in the optical imaging lens 1 for absorbing light with specific wavelength from the light passing optical imaging lens 1. In some example embodiments, the housing 21, the lens barrel 23, and/or the module housing unit 24 may be integrated into a single component or assembled by multiple components. In some example embodiments, the image sensor 171 used in the present embodiment is directly attached to a substrate 172 in the form of a chip on board (COB) package, and such package is different from traditional chip scale packages (CSP) since COB package does not require a cover glass before the image sensor 171 in the optical imaging lens 1. Aforesaid exemplary embodiments are not limited to this package type and could be selectively incorporated in other described embodiments.

Except between the image-side surface 152 of the fifth lens element 150 and the object-side surface 161 of the sixth lens element 160, an air gap is formed between any two adjacent lens elements of the six lens elements 110, 120, 130, 140, 150, 160, positioned in the lens barrel 23. However, in some other embodiments, an air gap between any two adjacent lens elements may be omitted or an air gap between the fifth lens element and the sixth lens element may be added.

Because in the optical imaging lens 1, the distance between the object-side surface 111 of the first lens element 110 and the image plane 170 along the optical axis is 19.806 mm, the size of the mobile device 20 may be quite small. Therefore, the embodiments described herein meet the market demand for smaller sized product designs.

According to above illustration, it is clear that the camera device and the optical imaging lens thereof in example embodiments, through controlling the detail structure of the lens elements, the length of the optical imaging lens is effectively shortened and meanwhile good optical characters are still provided.

While various embodiments in accordance with the disclosed principles been described above, it should be understood that they are presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, sequentially from an object side to an image side along an optical axis, comprising a first lens element, a second lens element, a third lens element, an aperture stop, a fourth lens element, a fifth lens element and a sixth lens element, each of said first, second, third, fourth, fifth and sixth lens elements having refracting power, an object-side surface facing toward the object side and an image-side surface facing toward the image side and a central thickness defined along the optical axis, wherein:

said object-side surface of said first lens element comprises a convex portion in a vicinity of the optical axis;

said object-side surface of said second lens element comprises a convex portion in a vicinity of the optical axis;

said image-side surface of said fourth lens element comprises a convex portion in a vicinity of a periphery of the fourth lens element;

said object-side surface of said fifth lens element comprises a convex portion in a vicinity of a periphery of the fifth lens element;

said object-side surface of said sixth lens element comprises a concave portion in a vicinity of the optical axis;

said optical imaging lens comprises no other lenses having refracting power beyond the six lens elements; and the central thickness of the second lens element along the optical axis is CT2, the central thickness of the third lens element along the optical axis is CT3, an air gap between the third lens element and the fourth lens element along the optical axis is AC34, and CT2, CT3 and AC34 satisfy the equation:

$$3.0 \leq (CT2+CT3)/AC34, \text{ and}$$

wherein a sum of the thickness of all six lens elements along the optical axis is ALT, and CT3 and ALT satisfy the equation:

$$ALT/CT3 \leq 5.6.$$

2. The optical imaging lens according to claim 1, wherein a sum of all five air gaps from the first lens element to the sixth lens element along the optical axis is AAG, and ALT and AAG satisfy the equation:

$$ALT/AAG \leq 2.8.$$

3. The optical imaging lens according to claim 1, wherein CT3, ALT and AAG satisfy the equation:

$1.3 \leq (CT3+ALT)/AAG$.

4. The optical imaging lens according to claim 3, wherein a central thickness of the fifth lens element along the optical axis is CT5, an air gap between the second lens element and the third lens element along the optical axis is AC23, and CT5 and AC23 satisfy the equation:

$1.5 \leq AC23/CT5$.

5. The optical imaging lens according to claim 1, wherein the central thickness of the fourth lens element along the optical axis is CT4, a sum of all five air gaps from the first lens element to the sixth lens element along the optical axis is AAG, and CT3, CT4 and AAG satisfy the equation:

$3.35 \leq (CT3+AAG)/CT4$.

6. The optical imaging lens according to claim 5, wherein an air gap between the second lens element and the third lens element along the optical axis is AC23, and CT4 and AC23 satisfy the equation:

$1.5 \leq AC23/CT4$.

7. The optical imaging lens according to claim 6, wherein CT2, CT3 and AAG satisfy the equation:

$0.5 \leq (CT2+CT3)/AAG$.

8. The optical imaging lens according to claim 1, wherein the central thickness of the first lens element along the optical axis is CT1, an air gap between the second lens element and the third lens element along the optical axis is AC23, and CT1 and AC23 satisfy the equation:

$1.1 \leq AC23/CT1$.

9. The optical imaging lens according to claim 8, wherein the central thickness of the sixth lens element along the optical axis is CT6, and CT3 and CT6 satisfy the equation:

$2.95 \leq CT3/CT6$.

10. The optical imaging lens according to claim 8, wherein the central thickness of the sixth lens element along the optical axis is CT6, a sum of all five air gaps from the first lens element to the sixth lens element along the optical axis is AAG, and CT6 and AAG satisfy the equation:

$5.5 \leq AAG/CT6$.

11. The optical imaging lens according to claim 1, wherein the central thickness of the fifth lens element along the optical axis is CT5, a sum of all five air gaps from the first lens element to the sixth lens element along the optical axis is AAG, and CT5 and AAG satisfy the equation:

$2.0 \leq AAG/CT5$.

12. The optical imaging lens according to claim 11, wherein the central thickness of the sixth lens element along the optical axis is CT6, an air gap between the second lens element and the third lens element along the optical axis is AC23, and CT6 and AC23 satisfy the equation:

$3.0 \leq AC23/CT6$.

13. The optical imaging lens according to claim 12, wherein CT2, CT3 and AAG satisfy the equation:

$0.5 \leq (CT2+CT3)/AAG$.

14. The optical imaging lens according to claim 1, wherein the central thickness of the first lens element along the optical axis is CT1, an air gap between the second lens element and the third lens element along the optical axis is AC23, an air gap between the fourth lens element and the fifth lens element along the optical axis is AC45, and CT1, AC23 and AC45 satisfy the equation:

$1.1 \leq AC23/(AC45+CT1)$.

15. The optical imaging lens according to claim 1, wherein the central thickness of the fourth lens element along the optical axis is CT4, a sum of all five air gaps from the first lens element to the sixth lens element along the optical axis is AAG, and CT4 and AAG satisfy the equation:

$2.9 \leq AAG/CT4$.

16. The optical imaging lens according to claim 15, wherein an air gap between the first lens element and the second lens element along the optical axis is AC12, and CT2, CT3, AC12 and AC34 satisfy the equation:

$1.2 \leq (CT2+CT3)/(AC12+AC34)$.

17. A camera device, comprising:
a housing; and
a photography module positioned in the housing and comprising:
an optical imaging lens, sequentially from an object side to an image side along an optical axis, comprising a first lens element, a second lens element, a third lens element, an aperture stop, a fourth lens element, a fifth lens element and a sixth lens element, each of said first, second, third, fourth, fifth and sixth lens elements having refracting power, an object-side surface facing toward the object side, an image-side surface facing toward the image side and a central thickness defined along the optical axis, wherein:
said first lens element has negative refracting power;
said object-side surface of said first lens element comprises a convex portion in a vicinity of the optical axis;
said object-side surface of said second lens element comprises a convex portion in a vicinity of the optical axis;
said image-side surface of said fourth lens element comprises a convex portion in a vicinity of a periphery of the fourth lens element;
said object-side surface of said fifth lens element comprises a convex portion in a vicinity of a periphery of the fifth lens element;
said object-side surface of said sixth lens element comprises a concave portion in a vicinity of the optical axis; and
said optical imaging lens comprises no other lenses having refracting power beyond the six lens elements; and
the central thickness of the second lens element along the optical axis is CT2, the central thickness of the third lens element along the optical axis is CT3, an air gap between the third lens element and the fourth lens element along the optical axis is AC34, and CT2, CT3 and AC34 satisfy the equation:

$3.0 \leq (CT2+CT3)/AC34$, and wherein a sum of the thickness of all six lens elements along the optical axis is ALT, and CT3 and ALT satisfy the equation:

$ALT/CT3 \leq 5.6$;

a lens barrel for positioning the optical imaging lens;
a module housing unit for positioning the lens barrel; and
an image sensor positioned at the image side of the optical imaging lens.

* * * * *